(12) United States Patent
Quan et al.

(10) Patent No.: US 9,295,033 B2
(45) Date of Patent: Mar. 22, 2016

(54) SYSTEMS AND METHODS FOR NARROWBAND CHANNEL SELECTION

(71) Applicant: QUALCOMM Incorporated, San Diego, CA (US)

(72) Inventors: Zhi Quan, San Jose, CA (US); Simone Merlin, San Diego, CA (US); Santosh Paul Abraham, San Diego, CA (US); Sameer Vermani, San Diego, CA (US); Hemanth Sampath, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 549 days.

(21) Appl. No.: 13/721,277

(22) Filed: Dec. 20, 2012

(65) Prior Publication Data

US 2013/0195036 A1   Aug. 1, 2013

Related U.S. Application Data

(60) Provisional application No. 61/593,214, filed on Jan. 31, 2012, provisional application No. 61/616,697, filed on Mar. 28, 2012, provisional application No. 61/698,904, filed on Sep. 10, 2012, provisional application No. 61/719,229, filed on Oct. 26, 2012, provisional application No. 61/733,048, filed on Dec. 4, 2012.

(51) Int. Cl.
*H04L 12/28* (2006.01)
*H04W 72/04* (2009.01)
(Continued)

(52) U.S. Cl.
CPC ............ *H04W 72/04* (2013.01); *H04W 72/085* (2013.01); *H04W 84/18* (2013.01)

(58) Field of Classification Search
USPC .......................................... 370/252, 329, 386
See application file for complete search history.

(56) References Cited

U.S. PATENT DOCUMENTS 7,773,951 B2 * 8/2010 Molnar et al. ............. 455/67.13
8,107,887 B2   1/2012 Rao et al.
(Continued)

FOREIGN PATENT DOCUMENTS

WO    WO 9403883 A1 *  2/1994

OTHER PUBLICATIONS

IEEE, IEEE Standard for Information technology—Telecommunications and information exchange between systems—Local and metropolitan area networks—Specific requirements Part 11: Wireless LAN Medium Access Control (MAC) and Physical Layer (PHY) Specifcations Amendment 5: Enhancements for Higher Throughput, Oct. 29, 2009, IEEE, IEEE Std.802.11n, p.*

(Continued)

*Primary Examiner* — John Pezzlo
(74) *Attorney, Agent, or Firm* — Kevin T. Cheatham

(57) ABSTRACT

Systems, methods, and devices for narrowband channel selection in a wireless communications network are described herein. In one aspect, a wireless communications device includes a receiver, processor, and transmitter. The receiver is configured to wirelessly receive messages from a first device over a plurality of channels. The processor is configured to estimate a quality of each channel based on one message received from the first device over each channel, select for wireless communication a first channel of the plurality of channels based on the estimated quality of each channel, and prepare a selection message indicating selection of the first channel for wireless communication. The transmitter is configured to transmit the selection message to the first device.

54 Claims, 11 Drawing Sheets

(51) Int. Cl.
  *H04W 72/08* (2009.01)
  *H04J 1/16* (2006.01)
  *H04W 84/18* (2009.01)

(56) References Cited

U.S. PATENT DOCUMENTS

| | | | | |
|---|---|---|---|---|
| 8,228,861 | B1* | 7/2012 | Nix | H04W 36/00 |
| | | | | 370/329 |
| 8,787,385 | B2* | 7/2014 | Liu et al. | 370/395.21 |
| 2002/0060995 | A1 | 5/2002 | Cervello et al. | |
| 2005/0245258 | A1 | 11/2005 | Classon et al. | |
| 2005/0281226 | A1 | 12/2005 | Lee et al. | |
| 2006/0019673 | A1* | 1/2006 | Yagyu et al. | 455/454 |
| 2006/0120395 | A1 | 6/2006 | Xing et al. | |
| 2007/0149230 | A1 | 6/2007 | Song et al. | |
| 2007/0286122 | A1* | 12/2007 | Fonseca | 370/329 |
| 2008/0032630 | A1* | 2/2008 | Kim | H04L 25/0224 |
| | | | | 455/45 |
| 2008/0222303 | A1* | 9/2008 | Archer et al. | 709/238 |
| 2009/0279464 | A1* | 11/2009 | Kakani et al. | 370/311 |
| 2010/0020773 | A1* | 1/2010 | Jechoux | 370/338 |
| 2010/0091715 | A1 | 4/2010 | Akchurin et al. | |
| 2010/0195588 | A1 | 8/2010 | Wan et al. | |
| 2011/0032883 | A1 | 2/2011 | Patil et al. | |
| 2011/0044193 | A1 | 2/2011 | Forenza et al. | |
| 2011/0096739 | A1* | 4/2011 | Heidari et al. | 370/329 |
| 2011/0096747 | A1 | 4/2011 | Seok | |
| 2011/0280141 | A1* | 11/2011 | Chin et al. | 370/252 |
| 2011/0299428 | A1* | 12/2011 | Cacioppo et al. | 370/259 |
| 2012/0069804 | A1* | 3/2012 | Kim et al. | 370/329 |

OTHER PUBLICATIONS

Fischer, et al., "Frequency Selective Transmission—MAC Aspects", Broadcom Extend Submission, Oct. 24, 2011, pp. 1-7.
International Search Report and Written Opinion—PCT/US2013/024169—ISA/EPO—May 31, 2013.
Porat, et al., "Frequency Selective Transmission—PHY Performance", Broadcom Extend Submission, Oct. 24, 2011, pp. 1-10.

* cited by examiner

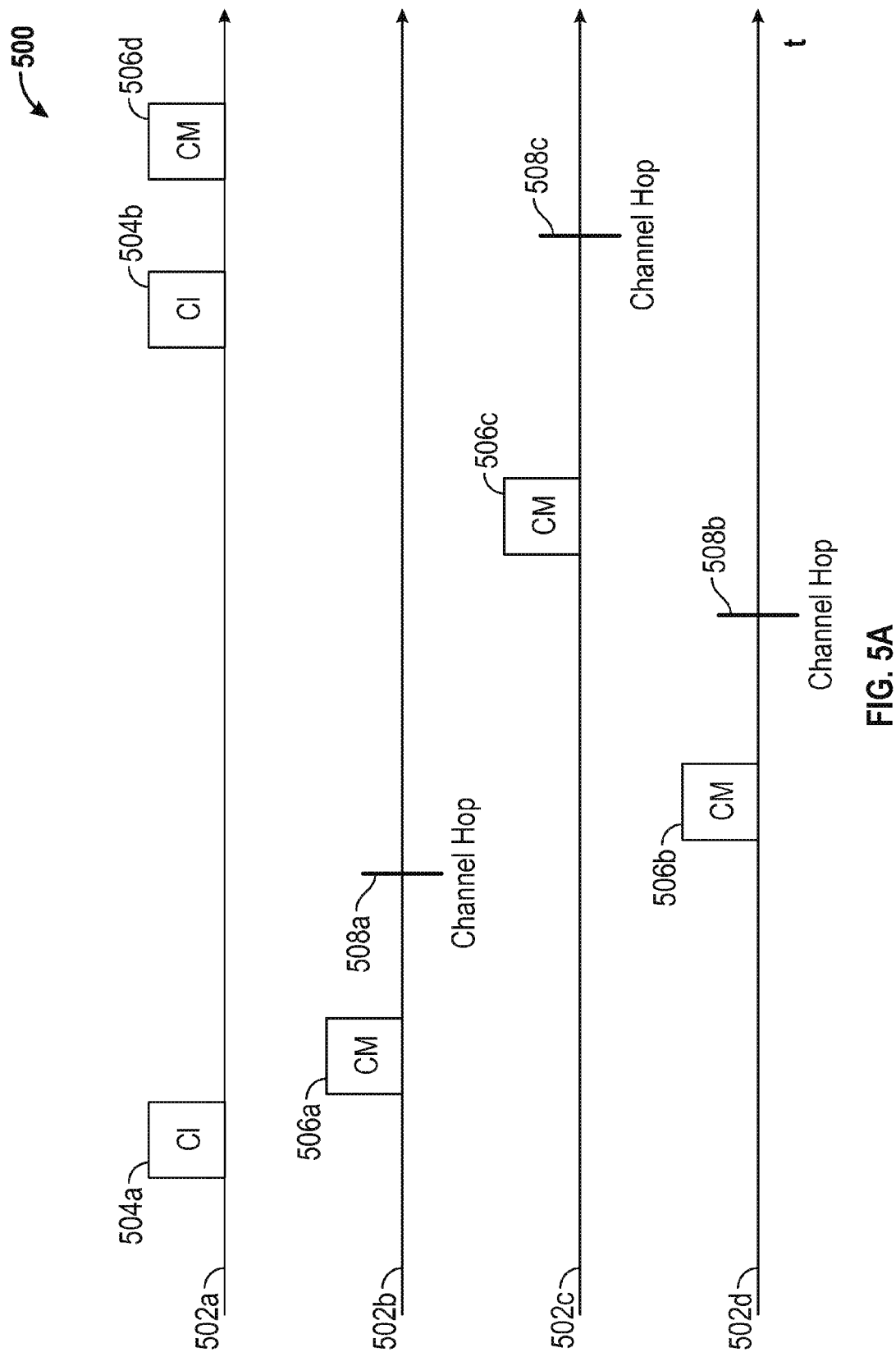

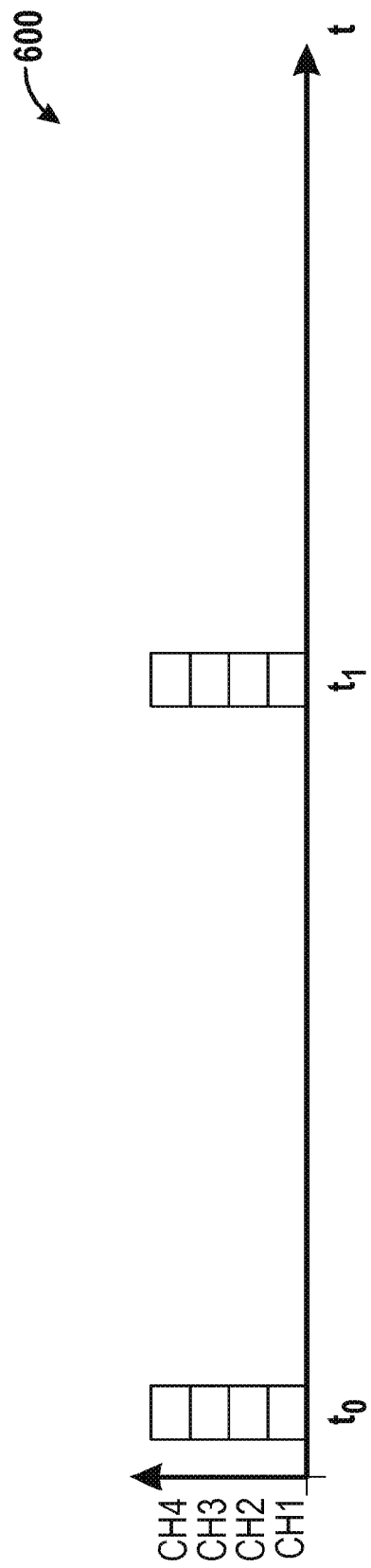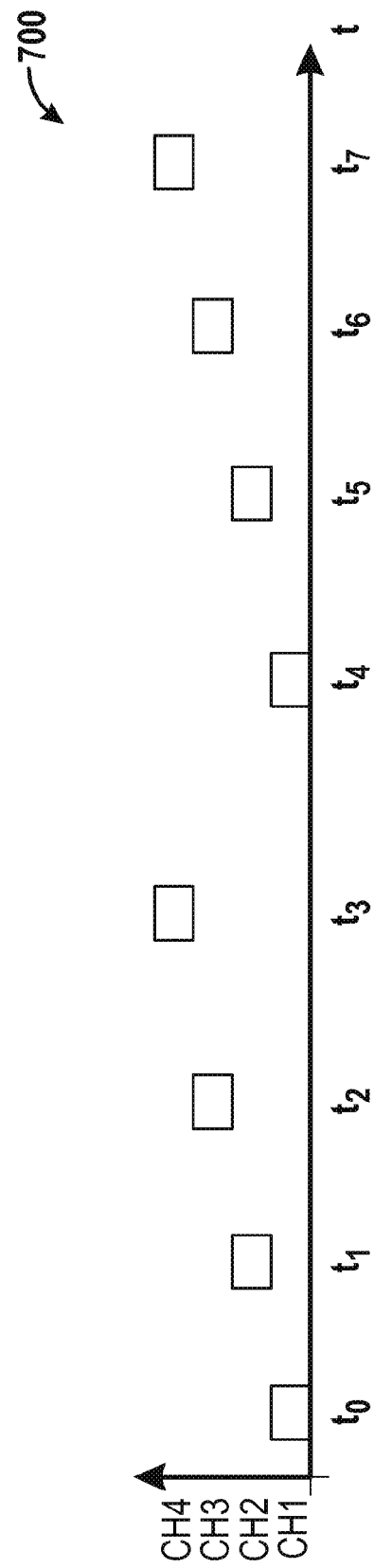

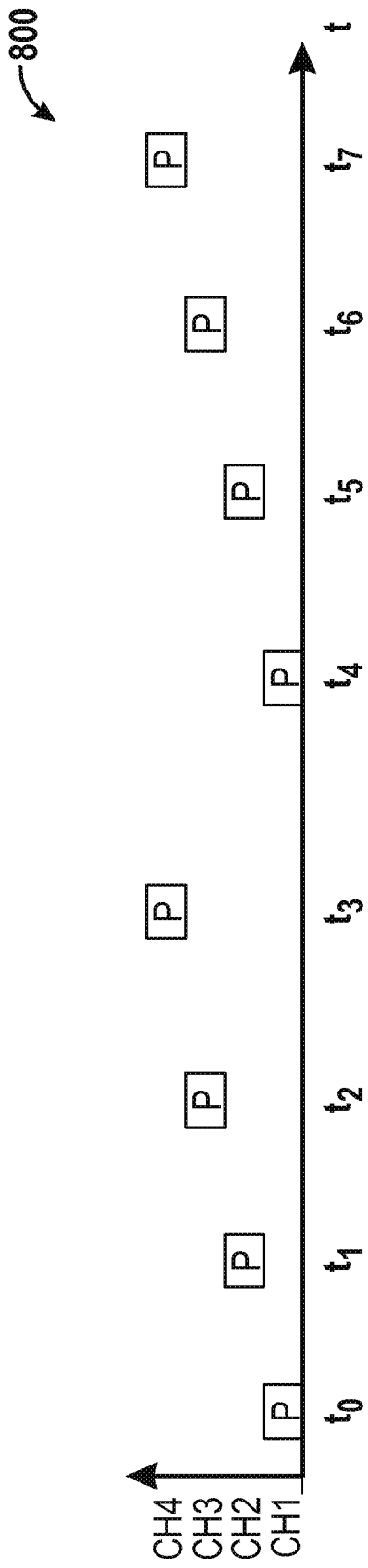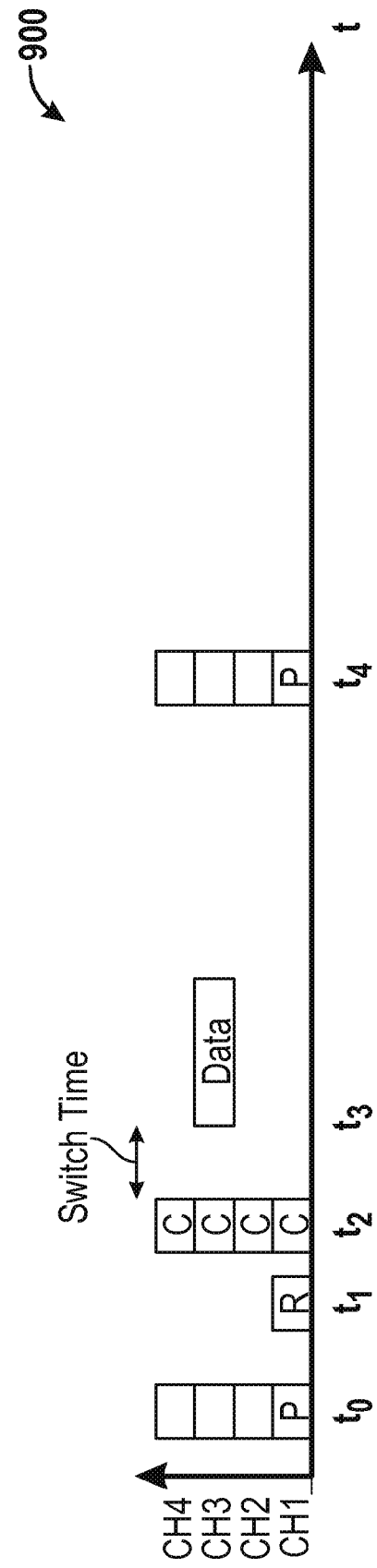

SYSTEMS AND METHODS FOR NARROWBAND CHANNEL SELECTION

CROSS REFERENCE TO RELATED APPLICATIONS

This application claims benefit under 35 U.S.C. §119(e) to U.S. Provisional Patent Application No. 61/593,214 entitled "SYSTEMS AND METHODS FOR NARROWBAND CHANNEL SELECTION" filed on Jan. 31, 2012, the disclosure of which is hereby incorporated by reference in its entirety. This application additionally claims benefit under 35 U.S.C. §119(e) to U.S. Provisional Patent Application No. 61/616,697 entitled "SYSTEMS AND METHODS FOR NARROWBAND CHANNEL SELECTION" filed on Mar. 28, 2012, the disclosure of which is hereby incorporated by reference in its entirety. This application additionally claims benefit under 35 U.S.C. §119(e) to U.S. Provisional Patent Application No. 61/698,904 entitled "SYSTEMS AND METHODS FOR NARROWBAND CHANNEL SELECTION" filed on Sep. 10, 2012, the disclosure of which is hereby incorporated by reference in its entirety. This application additionally claims benefit under 35 U.S.C. §119(e) to U.S. Provisional Patent Application No. 61/719,229 entitled "SYSTEMS AND METHODS FOR NARROWBAND CHANNEL SELECTION" filed on Oct. 26, 2012, the disclosure of which is hereby incorporated by reference in its entirety. This application additionally claims benefit under 35 U.S.C. §119(e) to U.S. Provisional Patent Application No. 61/733,048 entitled "SYSTEMS AND METHODS FOR NARROWBAND CHANNEL SELECTION" filed on Dec. 4, 2012, the disclosure of which is hereby incorporated by reference in its entirety.

FIELD

The present application relates generally to wireless communications, and more specifically to systems, methods, and devices for narrowband channel selection in a wireless communication network.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

In some wireless networks, devices communicate on multiple narrowband channels. Improved systems, methods, and devices for narrowband channel communication and selection are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved narrowband channel selection for devices in a wireless network.

One aspect of this disclosure provides an apparatus for wireless communication including a receiver, a processor, and a transmitter. The receiver is configured to wirelessly receive messages from a first device over a plurality of channels. The processor is configured to estimate a quality of each channel based on one message received from the first device over each channel, select for wireless communication a first channel of the plurality of channels based on the estimated quality of each channel, and prepare a selection message indicating selection of the first channel for wireless communication. The transmitter is configured to transmit the selection message to the first device.

Another aspect of this disclosure provides a method of wireless communication including: wirelessly receiving messages from a first device over a plurality of channels; estimating a quality of each channel based on one message received from the first device over each channel; selecting for wireless communication a first channel of the plurality of channels based on the estimated quality of each channel; preparing a selection message indicating selection of the first channel for wireless communication; and transmitting the selection message to the first device.

One aspect of this disclosure provides an apparatus for wireless communication including: means for wirelessly receiving messages from a first device over a plurality of channels; means for estimating a quality of each channel based on one message received from the first device over each channel; means for selecting for wireless communication a first channel of the plurality of channels based on the estimated quality of each channel; means for preparing a selection message indicating selection of the first channel for wireless communication; and means for transmitting the selection message to the first device.

Another aspect of this disclosure provides a non-transitory computer storage that stores executable program instructions that direct a wireless communication apparatus to perform a process that includes: wirelessly receiving messages from a first device over a plurality of channels; estimating a quality of each channel based on one message received from the first device over each channel; selecting for wireless communication a first channel of the plurality of channels based on the estimated quality of each channel; preparing a selection message indicating selection of the first channel for wireless communication; and transmitting the selection message to the first device.

One aspect of this disclosure provides a wireless communications device including a processor, transmitter, and receiver of a first device. The receiver is configured to wirelessly receive messages from a second device over a plurality of channels for narrowband wireless communication. The processor is configured to determine a primary channel of the second device, estimate a quality of each channel of the plurality of channels based at least in part on one message received from the second device over each channel, select for wireless communication a first channel with a highest quality based at least in part on the estimated quality of each channel, and determine a configuration message identifying the first channel for wireless communication. The transmitter is configured to transmit the configuration message to the second device using the primary channel of the second device.

Another aspect of this disclosure provides a wireless communications device including a processor, transmitter and receiver of a first device. The receiver is configured to wirelessly receive messages from a second device over a plurality of channels for narrowband wireless communication. The processor is configured to determine a schedule of when the primary channel of the second device will be a particular channel, estimate a quality of each channel of the plurality of channels based at least in part on one message received from the second device over each channel, select a first channel with a highest quality based at least in part on the estimated quality of each channel, determine when the primary channel of the second device will be the selected first channel. The transmitter is configured to transmit a configuration message to the second device using the first channel at a time when the primary channel of the second device is the selected first channel.

BRIEF DESCRIPTION OF THE DRAWINGS

FIG. 5A illustrates an example wireless communication timeline.

FIG. 6 illustrates an example wireless communication timeline.

FIG. 7 illustrates an example wireless communication timeline.

FIG. 8 illustrates an example wireless communication timeline.

FIG. 9 illustrates an example wireless communication timeline.

DETAILED DESCRIPTION

Figure 1:
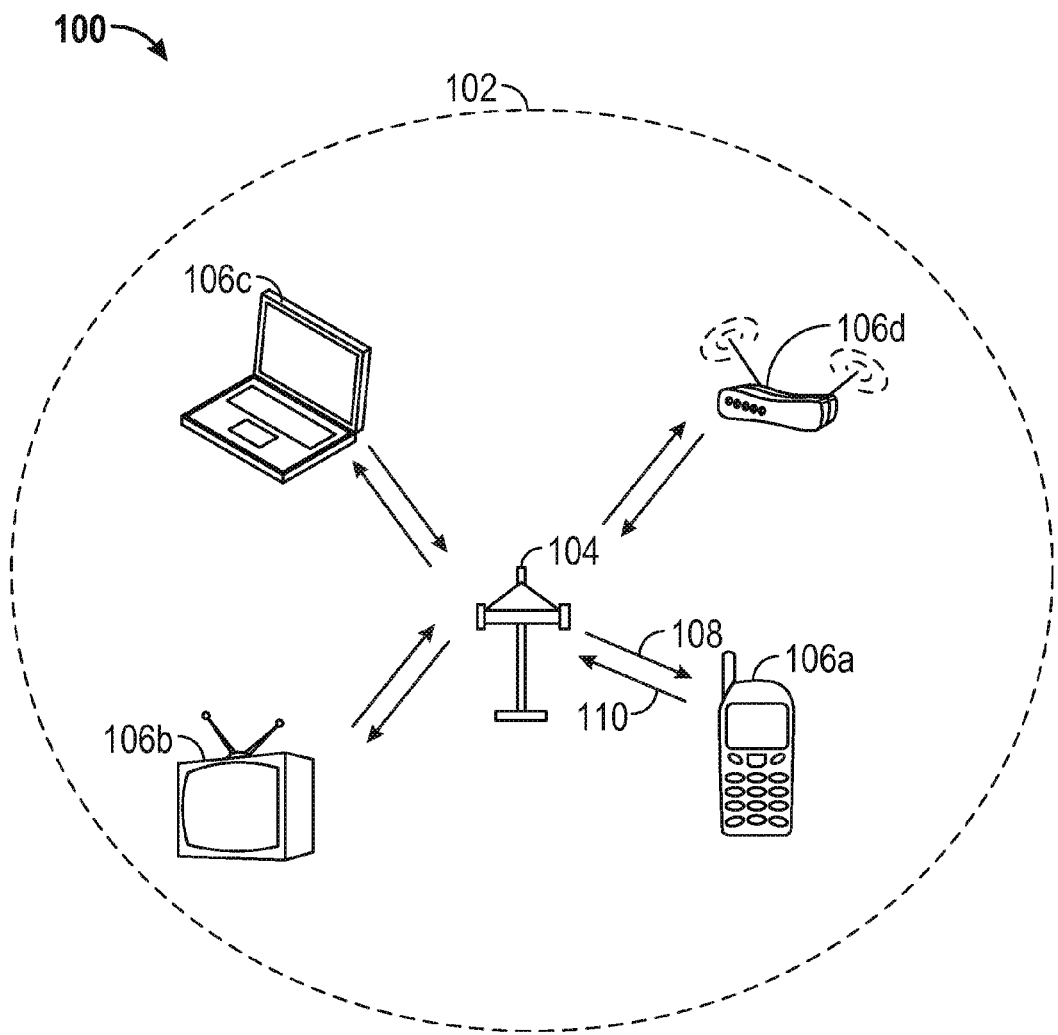
FIG. 1 shows an example wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Further, wireless signals may be transmitted in 802.11ah narrowband 1 MHz or 2 MHz channels, for instance. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol such as 802.11ah) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Wireless nodes, such as stations and APs, may interact in a Carrier Sense Multiple Access (CSMA) type network, such as a network that conforms to the 802.11ah standard. CSMA is a probabilistic Media Access Control (MAC) protocol. "Carrier Sense" describes the fact that a node attempting to transmit on a medium may use feedback from its receiver to detect a carrier wave before trying to send its own transmission. "Multiple Access" describes the fact that multiple nodes may send and receive on a shared medium. Accordingly, in a CSMA type network, a transmitting node senses the medium and if the medium is busy (i.e. another node is transmitting on the medium), the transmitting node will defer its transmission to a later time. If, however, the medium is sensed as free, then the transmitting node may transmit its data on the medium.

Clear Channel Assessment (CCA) is used to determine the state of the medium before a node attempts to transmit thereon. The CCA procedure is executed while a node's receiver is turned on and the node is not currently transmitting a data unit such as a packet. A node may sense whether the medium is clear by, for example, detecting the start of a packet by detecting the packet's PHY preamble, which may be referred to as preamble detection. Further, the node may estimate a defer time or delay time from an acknowledge (ACK) indication in a signal (SIG) field, for instance. The preamble detection method may detect relatively weaker signals. Accordingly, there is a low detection threshold with this method. An alternative method is to detect some energy on the air, which may be referred to as energy detection. Energy detection may be used to sense one or more channels at one time. The energy detection method is relatively more difficult than detecting the start of a packet and may only detect relatively stronger signals. As such, there is higher detection threshold with this method relative to preamble detection. In general, detection of another transmission on the medium is a function of the received power of the transmission, where the received power is the transmitted power minus the path loss.

While CSMA is particularly effective for mediums that are not heavily used, performance degradation may occur where the medium becomes crowded with many devices trying to access it simultaneously. When multiple transmitting nodes try to use the medium at once, collisions between the simultaneous transmissions may occur and transmitted data may be lost or corrupted. Because with wireless data communications it is generally not possible to listen to the medium while transmitting on it, collision detection is not possible. Further, transmissions by one node are generally only received by other nodes using the medium that are in range of the transmitting node. This is known as the hidden node problem, whereby, for example, a first node wishing to transmit to and in range of a receiving node, is not in range of a second node that is currently transmitting to the receiving node, and therefore the first node cannot know that the second node is transmitting to the receiving node and thus occupying the medium. In such a situation, the first node may sense that the medium is free and begin to transmit, which may then cause a collision and lost data at the receiving node. Accordingly, collision avoidance schemes are used to improve the performance of CSMA by attempting to divide access to the medium up somewhat equally among all transmitting nodes within a collision domain. Notably, collision avoidance differs from collision detection due to the nature of the medium, in this case the radio frequency spectrum.

In a CSMA network utilizing collision avoidance (CA), a node wishing to transmit first senses the medium and if the medium is busy then it defers or delays (i.e., does not transmit) for a period of time. The period of deferral is followed by a randomized backoff period (i.e., an additional period of time in which the node wishing to transmit will not attempt to access the medium). The backoff period is used to resolve contention between different nodes trying to access a medium at the same time. The backoff period may also be referred to as a contention window. Backoff requires each node trying to access a medium to choose a random number in a range and wait for the chosen number of time slots before trying to access the medium, and to check whether a different node has accessed the medium before. The slot time is defined in such a way that a node will always be capable of determining if another node has accessed the medium at the beginning of the previous slot. In particular, the 802.11 standard uses an exponential backoff algorithm wherein each time a node chooses a slot and collides with another node, it will increase the maximum number of the range exponentially. If, on the other hand, a node wishing to transmit senses the medium as free for a specified time (e.g., the Distributed Inter Frame Space (DIFS) in the 802.11 standard, or Point Coordination Function Inter Frame Space (PIFS) in other cases), then the node is allowed to transmit on the medium. After transmitting, the receiving node may perform a cyclic redundancy check (CRC) of the received data and send an acknowledgement back to the transmitting node. Receipt of the acknowledgment by the transmitting node will indicate to the transmitting node that no collision has occurred. Similarly, no receipt of an acknowledgment at the transmitting node will indicate that a collision has occurred and that the transmitting node should resend the data.

Additionally, a wireless network may implement virtual carrier sensing whereby a node wishing to transmit will first transmit a short control packet called a Request to Send (RTS) to a receiving node. The RTS may include a source, destination and duration of the transmission, including the responsive acknowledgment. If the medium is free, the receiving node will respond with a Clear to Send (CTS) message, which may include the same information as the RTS. Any node within range of either the RTS or CTS will set its virtual carrier sense indicator (also called Network Allocation Vector (NAV)) for the given duration and will defer from attempting to transmit on the medium during that period. Thus, implementing virtual carrier sensing reduces the probability of a collision at the receiving node by a hidden transmitting node. Use of RTS and CTS may also reduce overhead because the RTS and CTS message frames are relatively shorter than the full message frame intended to be transmitted by the transmitting node. That is, because the transmitting node may send and RTS and not receive a CTS, indicating that the receiver is busy, it has used less medium time as compared to sending a full data frame and not receiving an acknowledgement.

FIG. 1 shows an example wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit on one or more channels (e.g., multiple narrowband channels, each channel including a frequency bandwidth) a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
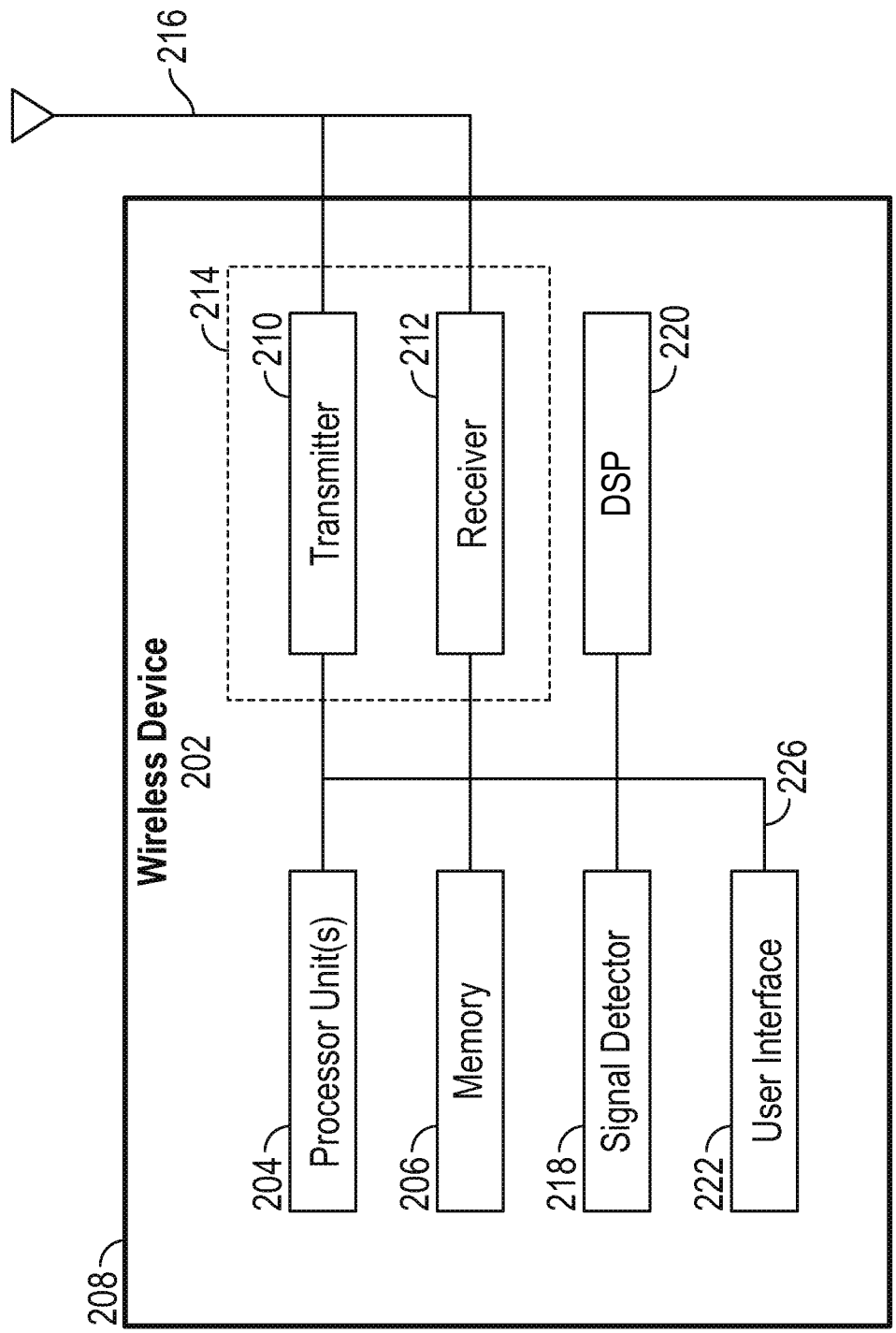
FIG. 2 shows a functional block diagram of an example wireless device that may be employed within the wireless communication system of FIG. 1.

FIG. 2 shows an example functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured, for example, to wirelessly transmit messages, such as polling messages that are configured to retrieve traffic pending and buffered for a device at another device. For example, the transmitter 210 may be configured to transmit polling messages generated by the processor 204, discussed above. When the wireless device 202 is implemented or used as an AP 104, the processor 204 may be configured to process polling messages. When the wireless device 202 is implemented or used as a STA 106, the processor 204 may also be configured to generate polling messages.

The receiver 212 may be configured to wirelessly receive polling messages, for example.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104 or a STA 106, and may be used to transmit and/or receive communications including polling messages, for example. That is, either AP 104 or STA 106 may serve as transmitter or receiver devices of polling messages. Certain aspects contemplate signal detector 218 being used by software running on memory 206 and processor 204 to detect the presence of a transmitter or receiver.

The STA 106 (FIG. 1) may have a plurality of operational modes. For example, the STA 106 may have a first operational mode referred to as an active mode. In the active mode, the STA 106 may always be in an "awake" state and actively transmit/receive data with the AP 104. Further, the STA 106 may have a second operational mode referred to as a power save mode. In the power save mode, the STA 106 may be in the "awake" state or a "doze" or "sleep" state where the STA 106 does not actively transmit/receive data with the AP 104. For example, the receiver 212 and possibly DSP 220 and signal detector 218 of the STA 106 may operate using reduced power consumption in the doze state. Further, in the power save mode, the STA 106 may occasionally enter the awake state to listen to messages from the AP 104 (e.g., paging messages configured to indicate to wireless devices whether or not the wireless devices have traffic pending and buffered at another device) that indicate to the STA 106 whether or not the STA 106 needs to "wake up" (e.g., enter the awake state) at a certain time so as to be able to transmit/receive data with the AP 104.

Accordingly, in certain wireless communication systems 100 (FIG. 1), the AP 104 may transmit paging messages to a plurality of STAs 106 in a power save mode in the same network as the AP 104, indicating whether or not the STAs 106 need to be in an awake state or a doze state. For example, if a STA 106 determines it is not being paged it may remain in a doze state. Alternatively, if the STA 106 determines it may be paged, the STA 106 may enter an awake state for a certain period of time to receive the page and further determine when to be in an awake state based on the page. Further, the STA 106 may stay in the awake state for a certain period of time after receiving the page. In another example, the STA 106 may be configured to function in other ways when being paged or not being paged that are consistent with this disclosure. For example, the page may indicate that the STA 106 should enter an awake state for a certain period of time because the AP 104 has data to transmit to the STA 106. The STA 106 may poll the AP 104 for data by sending the AP 104 a polling message when in the awake state for the period of time. In response to the polling message, the AP 104 may transmit the data to the STA 106.

In some aspects, paging messages may comprise a bitmap (not shown), such as a traffic identification map (TIM). In certain such aspects, the bitmap may comprise a number of bits. These paging messages may be sent from the AP 104 to STAs 106 in a beacon or a TIM frame. Each bit in the bitmap may correspond to a particular STA 106 of a plurality of STAs 106, and the value of each bit (e.g., 0 or 1) may indicate whether the particular STA 106 has traffic pending and buffered at the AP 104.

Still referring to FIG. 1, the STA 106 may estimate the quality of one or more channels based on one or more messages received from the AP 104. For example, in some implementations the STA 106 may receive a beacon signal, paging message, or a partial packet including a preamble portion on one or more of four different 2 MHz channels or 1 or more of 8 different 1 MHz channels from the AP 104. The STA 106 may estimate the signal to noise ratio for one or more of the 1 or 2 MHz channels based on the received message. The greater the signal to noise ratio, the higher the estimated quality of the channel determined by the STA 106. Accordingly, the STA 106 may then determine the relative quality of multiple channels based at least in part on the estimated quality of each channel. In some aspects, the STA 106 may listen to more than one channel simultaneously to estimate the quality of each channel.

Also, in some aspects, the STA 106 may utilize different approaches to estimate the quality of channels depending on an operating mode of an AP 104 or channel conditions. For instance, if the AP 104 changes channels infrequently (e.g., coherence time>>beacon interval), the STA 106 may estimate the quality of one or more channels based on a beacon signal. If the AP 104 changes channels frequently (e.g., coherence time≈beacon interval), the STA may estimate the quality of one or more channels based on a Null Data packet (NDP) transmitted by the AP 104. Further, in some aspects, the AP 104 may reserve a channel estimation period following a beacon signal. During the channel estimation period, the AP 104 may, for example, send NDPs over one or more channels. The AP 104 may send NDPs over all or a portion of the one or more channels simultaneously (for example, in all 1 MHz channels), as illustrated in communication timeline 600 of FIG. 6. For instance, the AP 104 may transmit NDPs simultaneously on channels 1 (CH1), 2 (CH2), 3 (CH3), and 4 (CH4) at times $t_0$ and $t_1$. In some implementations, the AP 104 may send one or more NDPs over the one or more channels at different times, as illustrated in communication timeline 700 of FIG. 7. For instance, the AP 104 may transmit one NDP on CH1 at time $t_0$, another NDP on CH2 at time $t_1$, and continue to transmit one NDP on one channel through times $t_2, t_3, t_4, t_5, t_6$, and $t_7$.

In some implementations, the AP 104 may be configured to receive packets on any channel at any time. In some implementations, an AP 104 with an operating bandwidth greater than 2 MHz may operate by setting its primary channel on one of the 1 or 2 MHz channels within its operating bandwidth. The AP 104 may also be configured to receive only packets on a primary channel. If the AP 104 is configured to receive packets on any channel, the STA 106 may be configured to commence transmitting to AP 104 at any time on any channel, without having to indicate which channel may be used. If the AP 104 is configured to receive packets on only the primary channel, the STA 106 may be configured to indicate to the AP 104 on which channel the STA 106 will transmit to the AP 104, using a configuration packet or another method.

The AP 104 may always use the same channel as a primary channel, such as the lowest frequency band channel of a plurality of channels, or may change primary channels. The AP 104 may, for example, change which channel is the primary channel during regularly-spaced intervals or during other intervals which may not be regularly-spaced. In some implementations, the AP 104 may send an NDP over each channel individually in regularly-spaced intervals, and may use the channel that it most recently sent an NDP over as the primary channel, until the next NDP is sent on another channel, as illustrated in communication timeline 800 of FIG. 8. For instance, the AP 104 may transmit one NDP on CH1 at time $t_0$, another NDP on CH2 at time $t_1$, and continue to transmit one NDP on one channel through times $t_2, t_3, t_4, t_5, t_6$, and $t_7$ to periodically change the primary channel of the AP 104. The STAs that may be associated with the AP 104 may be informed of the position of the primary channel. The switching of the primary channel may be conveyed to the STAs by the AP 104 as a schedule provided at association or later through a management exchange with the STAs. This information may be included in a beacon signal. For example, IEEE (Extended) Channel Switch Announcement frames or elements may be used to indicate the switch from one channel to another. Elements may be enhanced by including information on further future channel switches as well.

A STA 106 may not switch channels when the AP 104 informs the STA 106 of the change of primary channels. Instead, the STA 106 may stay on its selected channel even after the AP 104 has moved to another channel. The STA 106 in this case may not send packets to the AP 104, as the operating channel or channels of the AP 104 may not include the selected channel of the STA 106. The STA 106 may resume operation with the AP 104 as soon as the AP returns the primary channel to a channel which includes the STA 106 operating channel. In some implementations, the AP 104 may not indicate to the STA 106 which channel the AP 104 is switching to. If the STA 106 is not going to switch channels, the AP 104 may alert the STA 106 when the AP 104 will be on the selected channel of the STA 106, rather than alerting the STA 106 of what channel the AP 104 will be on. In some implementations, the AP 104 may indicate when its operation on a channel is starting and ending, such that STAs on a channel will be aware when the AP 104 is on the channel. In this case, the BSS on a given channel may only be active for the portion of time the AP 104 in on that channel. The AP 104 may use the same basic service set identification (BSSID) and service set identification (SSID) on multiple channels, or it may use different BSSIDs for different channels.

The STA 106 may select a channel with the highest quality for transmission of messages or data. Advantageously, since 1 MHz or 2 MHz channels may need a higher multipath fading margin due to less frequency diversity than a 20 MHz channel, for instance, a 1 MHz or 2 MHz channel with the highest quality may have a lower multipath fading margin than another channel. Thus, the STA 106 may also be able to successfully transmit data on the selected channel at a higher transmission rate, for example.

Figure 3:
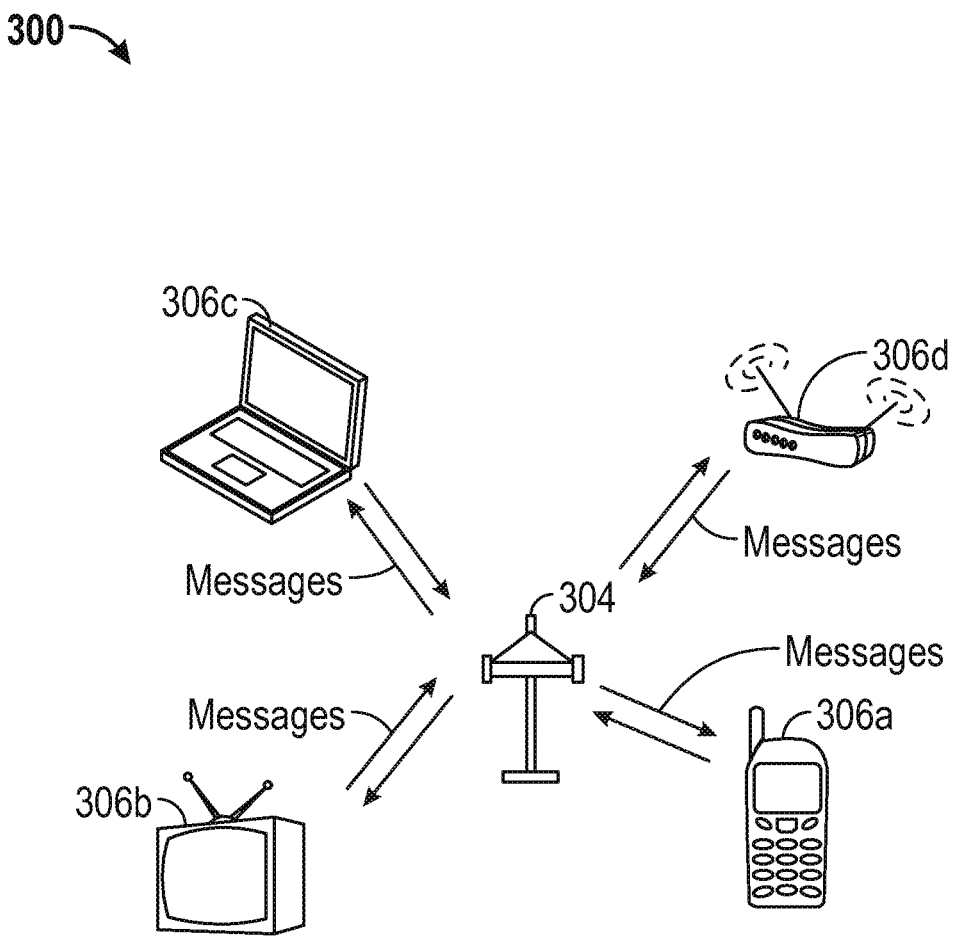
FIG. 3 illustrates an example wireless communication system.

FIG. 3 illustrates an example wireless communication system 300. The wireless communication system comprises an AP 304 and multiple STAs, including a first STA 306a, a second STA 306b, a third STA 306c, and a fourth STA 306d. The STAs may transmit various messages (e.g., polling messages) to the AP 304, and receive messages (e.g., beacon signals or paging messages) transmitted by the AP 304. The AP 304 and STAs may receive or transmit messages on one or more channels for narrowband communication. For example, the AP 304 and STAs may support wireless communication on eight or sixteen channels where each channel is a 1 MHz or 2 MHz frequency band.

The STAs may select for communication with the AP 304 a channel with a highest quality. The selection of the channel may be based in part on an estimate of the quality of each channel. The STAs may estimate the quality of each channel, for instance, using a signal to noise ratio determination for each channel based on a received message from the AP 304 over each channel. In some aspects, the STAs may select a different channel for communication based on other reasons, such as if the channel with highest quality has significant traffic, which may cause the STAs to significantly defer communication.

The STAs may prepare a configuration message or selection message for transmission to the AP 304. This configuration message may be an RTS or a Short RTS. A STA, such as the first STA 306a, may prepare the configuration message to indicate the selection by the STA of a particular channel for wireless communication between the STA and the AP 304. The STA may transmit the configuration message to the AP 304 on a particular channel to indicate the selection of the particular channel, and the configuration may not include in the contents of the configuration message that a particular channel is selected for communication. Additionally or alternatively, the may indicate in the contents of the configuration message that a particular channel is selected for communication, for instance, when the STA may not transmit the configuration message on the selected channel. In some aspects, the STA may transmit the configuration message on the particular channel selected by the STA. In other aspects, the STA may transmit the configuration message on a primary channel or one or more other channels for communication with the AP 304. The primary channel may, for instance, be indicated in a message from the AP 304 or may be known to be a lowest frequency band channel of a plurality of channels for communication with the AP 304. Advantageously, these channel selection approaches may provide a low overhead way for a STA to select a channel for communication.

A STA, such as the first STA 306a, may check for communication on a channel prior to transmitting on the channel. The STA may utilize, for example, preamble detection or energy detection to check for communication. If the STA senses a current communication on the channel, the STA may choose to defer communication on one or more channels using, for instance, the clear channel assessment and collision avoidance procedures discussed in this disclosure.

In some aspects, the AP 304 or a STA, such as the first STA 306a, may transmit on one or more channels a packet which includes a PHY preamble of a configuration message. One such packet may be a packet comprising only a partial packet including the preamble portion. The packet which includes a PHY preamble may indicate to other devices to defer communication on one or more channels, such as the channel selected by the STA for communication with the AP 304. In some aspects, the STA may transmit the packet on a primary channel or one or more other channels.

In one aspect, the first STA 306a, the second STA 306b, the third STA 306c, and the fourth STA 306d may each select a channel of a plurality of channels for communication with the AP 304. For instance, the first STA 306a and the second STA 306b may select a first 1 MHz channel, and the third STA 306c and the fourth STA 306d may select a second 1 MHz channel, different from the first 1 MHz channel. The STAs may contend for transmission on the selected channels and defer on one or more channels when communication is detected or determined. Additionally, the STAs may transmit on a primary a packet including a PHY preamble when they transmit on the selected channel to cause other STAs to defer communication.

In some aspects, the STAs may transmit a configuration message that also includes a request to send (RTS) packet or message. This configuration message may be sent to the AP 304 using the primary channel of the AP 304. Before transmitting the configuration message, the STAs may perform CCA on one or more channels and may detect a beacon signal to avoid possible collision or ACI. The configuration message may further be used to set network allocation vectors (NAVs) and reserve a channel which the STA prefers to use. The configuration message may be advantageously utilized in a situation where an AP 304 may not receive a message on an arbitrary channel without first being notified. For example, the AP 304 may be configured to only receive messages on a primary channel, and may not be configured to receive messages on other channels at the same time as it is listening to the primary channel. The AP 304 may then lock a secondary channel by transmitting on the channel, for example. The AP 304 may then receive a message on another channel, such a primary channel, from the first STA 306a requesting to communicate with AP 304 on a particular channel, such as the locked secondary channel. The AP 304 may then stop transmitting on the secondary channel, thereby unlocking the secondary channel, and begin communications with the first STA 306a on the secondary channel. In some implementations, the AP 304 may respond to a configuration message from the first STA 306a by accepting the request, denying the request, or by suggesting a different channel. The AP 304 may also respond indicating a new identifier the first STA 306a should use, or a group identifier. The group identifier may identify the set of STAs which are operating on the same channel. The AP 304 may further indicate the arrival times of the beacon on the selected channel, and the active period of the AP 304 on the selected channel.

In another aspect, if the AP 304 is configured to receive signals on any channel at any time, the configuration message from an STA may not need to alert the AP 304 which channel the STA intends to use. Instead, the STA may send a configuration message to the AP 304 that alerts the AP 304 that the STA wishes to send data to the AP 304, but without indicating a preferred channel.

Figure 10:
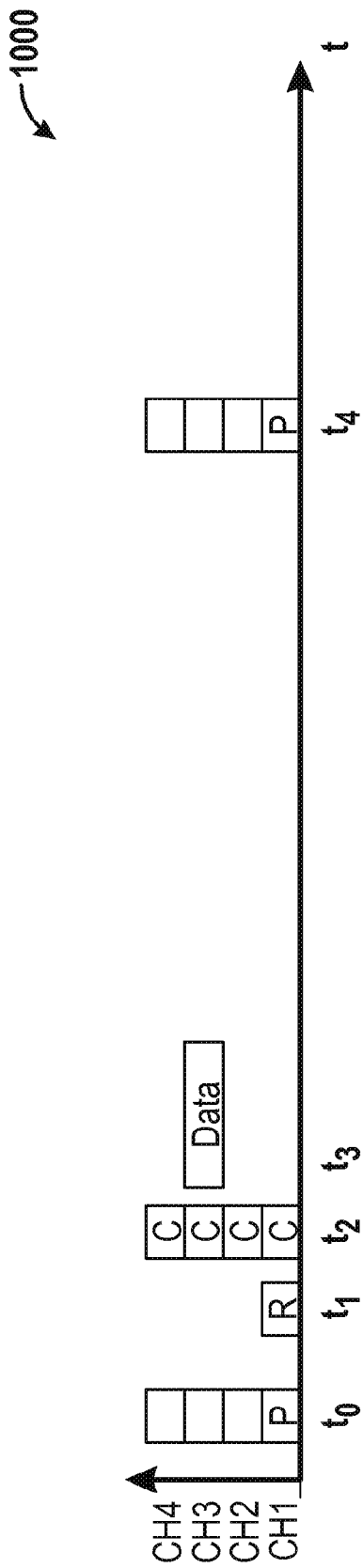
FIG. 10 illustrates an example wireless communication timeline.

As shown in FIG. 9, the AP 304 may transmit an acknowledgement message including a clear to send (CTS) packet or message in response to a configuration message comprising a request to send message from a STA, such as the first STA 306a. The acknowledgement message may be transmitted on a primary channel as well as one or more other channels. For example, the acknowledgement message (C) may be transmitted on all channels including a primary channel P, as illustrated in communication timeline 900 of FIG. 9 at time $t_2$, in response to the request to send message (R) at time $t_1$. Transmitting on all channels may be advantageous in some implementations, as this may reduce or avoid cross-channel interference. The acknowledgement message may acknowledge receipt of the configuration message from the first STA 306a by the AP 304 and/or indicate that the channel selected by the first STA 306a is available for wireless communication. Further, the acknowledgment message may be used to set NAVs and reserve a channel, such as to reserve the channel selected by the first STA 306a for communication between the AP 304 and first STA 306a. The CTS packet may thus provide protection against hidden nodes and avoid other STAs transmitting in the primary channel during a time in which the AP 304 may not be listening to the primary channel. In some aspects, the first STA 306a may defer transmission of data on the selected channel (e.g., CH3 at time $t_3$ in FIG. 9) until after receipt of the acknowledgement message from the AP 304, and possibly also until after an additional short interframe space (SIFS) time interval or particular channel switch time, as illustrated in FIG. 9. In some aspects, if the AP 304 can receive in any channel at any time, the AP 304 may not wait for a channel switching time, as illustrated in communication timeline 1000 of FIG. 10.

Figure 11:
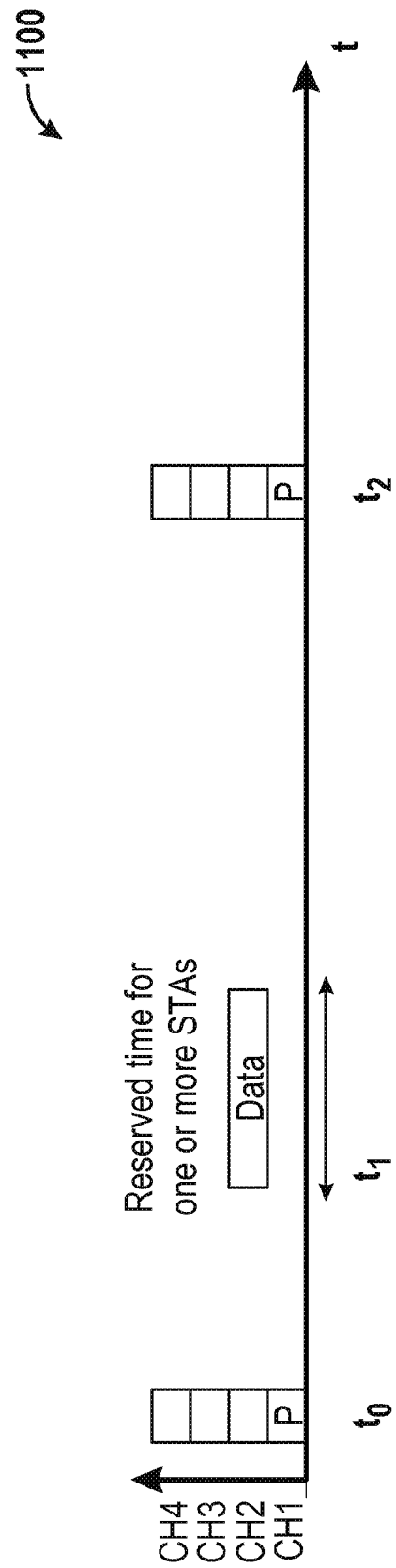
FIG. 11 illustrates an example wireless communication timeline.

If the AP 304 is configured to receive messages on any channel at any time, the first STA 306a may not need to wait for a channel switching time, nor to reserve a channel, as the AP 304 may reserve the medium before the first STA 306a may transmit. In some implementations, the RTS and CTS packets may be legacy packets, as they may not need to indicate a channel. In some implementations, if the AP 304 is configured to receive messages on any channel at any time, the AP 304 may reserve some time for transmission for the first STA 306a, as illustrated in communication timeline 1100 of FIG. 11. For instance, the AP 104 may transmit NDPs simultaneously on CH1, CH2, CH3, and CH4 at time $t_0$ to reserve time. The first STA 306a may use its selected channel to transmit to the AP 104. The first STA 306a may inform the AP 304 of its selected channel, and the AP 304 may send a CTS at the beginning of the reserved time for the first STA 306a. In some implementations, the AP 304 may define a periodic interval of time in which it will reserve time for the first STA 306a, in which the AP 304 will be operating on the selected channel of the first STA 306a.

The STA 306a may then switch to the channel indicated in the configuration message, and may send its frames to the AP 304 during this contention-free period. The STA 306a may first send another RTS packet, and wait for a CTS packet in response from the AP 304, using the channel indicated in the configuration message to ensure that both the AP 304 and the STA 306a are on the same channel. In one aspect, the AP 304 may poll the STA 306a, once the AP 304 has switched to the channel indicated in the configuration message.

Further, a STA may receive an acknowledgment message from the AP 304 in response to a configuration message including a request to send message, which was transmitted by another STA. The STA may defer communication on one or more channels based on the acknowledgement message. In some aspects, the STA may defer for a time indicated in the clear to send message of the acknowledgment message. Advantageously, the use of request to send and clear to send messages may avoid hidden node problems in the case of an overlapping basic service set.

In one aspect, the first STA 306a may transmit on a primary channel a configuration message including a request to send message to the AP 304. The configuration may indicate selection of a first 1 or 2 MHz channel or frequency band for communication between the first STA306a and the AP 304. In respond, the AP 304 may transmit an acknowledgement message including a clear to send message. The AP 304 may transmit an acknowledgement message on the first 2 MHz channel selected by the first STA 306a, as well as all other channels. The second STA 306b may sense the channels, receive the acknowledgement message including the clear to send message, and determine to defer any transmission for a time indicated in the clear to send message of the acknowledgment message. Additionally, the first STA 306a and AP 304 may then begin communicating on the first 2 MHz channel.

Figure 12:
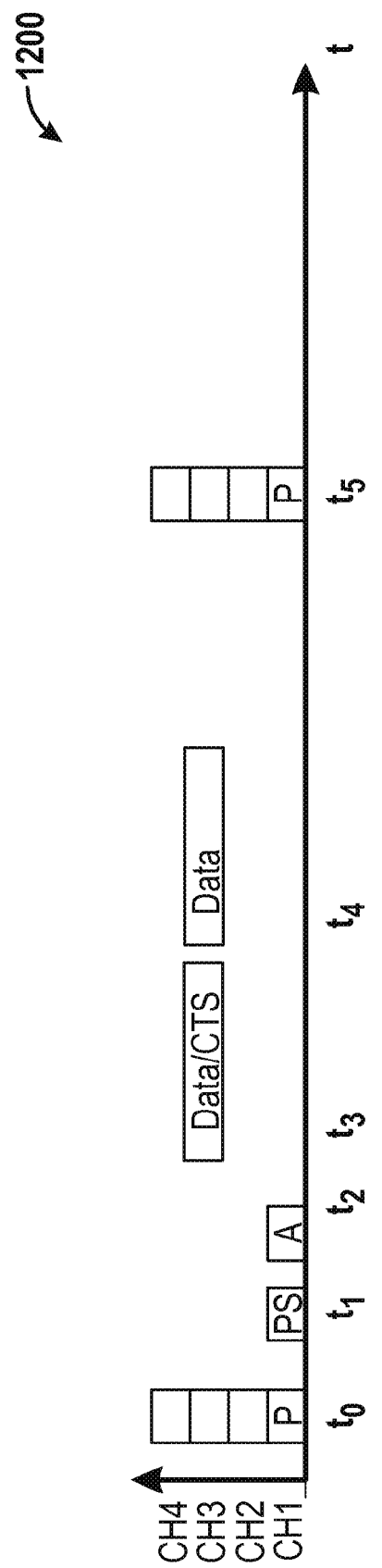
FIG. 12 illustrates an example wireless communication timeline.

In some aspects, the AP 304 may periodically broadcast a TIM frame or TIM message on one or more channels. The TIM message may indicate that STAs have data buffered at the AP 304. A STA with data buffered, such as the first STA 306a, for example, may transmit on one or more channels a configuration message including a polling message (e.g., a power-save poll or PS-Poll) to indicate that the first STA 306a would like to receive the buffered data on a particular channel from the AP 304. Further, the first STA 306a may transmit a packet including PHY preamble of the configuration message to cause other devices to defer communication on one or more channels. The first STA 306a may then wait on the particular channel selected by the first STA 306a for the AP 304 to transmit the buffered data. In response to the first STA 306a correctly receiving the buffered data from the AP 304, the first STA 306a may transmit on one or more channels an acknowledgement message to the AP 304. In one aspect, after the first STA 306a sends a polling message indicating the first STA 306a would like to receive the buffered data on a particular channel, the first STA 306a may wait in the primary chance to receive an ACK from the AP 304. This ACK may agree upon the channel indicated by the STA 306a in the polling message. The AP 304 may then transmit packets to each STA which requested buffered data, on the preferred channel of each STA. For example, the AP 304 may transmit packets to the first STA 306a on the channel selected by the first STA 306a in the polling message. The AP 304 may transmit these packets immediately after responding with ACK, or may transmit these packets later. For example, in the communication timeline 1200 of FIG. 12, the STA 306a may transmit a PS-Poll at time $t_i$ indicating the selected channel and receive an ACK (A) from the AP 304 at time $t_2$ agreeing to the selected channel for data exchange. The AP 304 may then transmit packets to the STA 306a at time $t_3$ and reserve a time period after time $t_4$ for transmission of data by the STA 306a.

In response to the first STA 306a correctly receiving the buffered data from the AP 304, when allowed by the AP 304, such as through a reverse direction grant, the first STA 306a may transmit data packets to the AP 304 on one or more channels. The AP 304 may allow the first STA 306a to send the data, upon indication that the first STA 306a has data pending. This indication may be included in the polling message, such as a PS-Poll.

In some implementations, the AP 304 may not be informed of the operating channel of the first STA 306a. The AP 304 may not know whether the first STA 306a is present and active in a given channel at a given time. In some implementations, in order to prevent the AP 304 from attempting to send data to the first STA 306a while the first STA 306a is not active or not present in a particular channel, the AP 304 may at least be informed that the first STA 306a is not available for receiving data. For example, this may be achieved using an existing power save mechanism, where the first STA 306a may indicate to the AP 304 that the first STA 306a is transitioning to a Doze state, so that the AP 304 may not send data to the first STA 306a. In this implementation, the first STA 306a need not actually be in a Doze state, but may simply be on a different channel. To resume operation, the first STA 306a may send a frame to the AP 304 indicating that the first STA 306a is awake. The first STA 306a may send this frame as soon as the first STA 306a knows that primary channel of the AP 304 is the operating channel of the first STA 306a. This frame may be any type of data frame, such as a PS-Poll with PM bit set or a QoS-Null frame.

Figure 4:
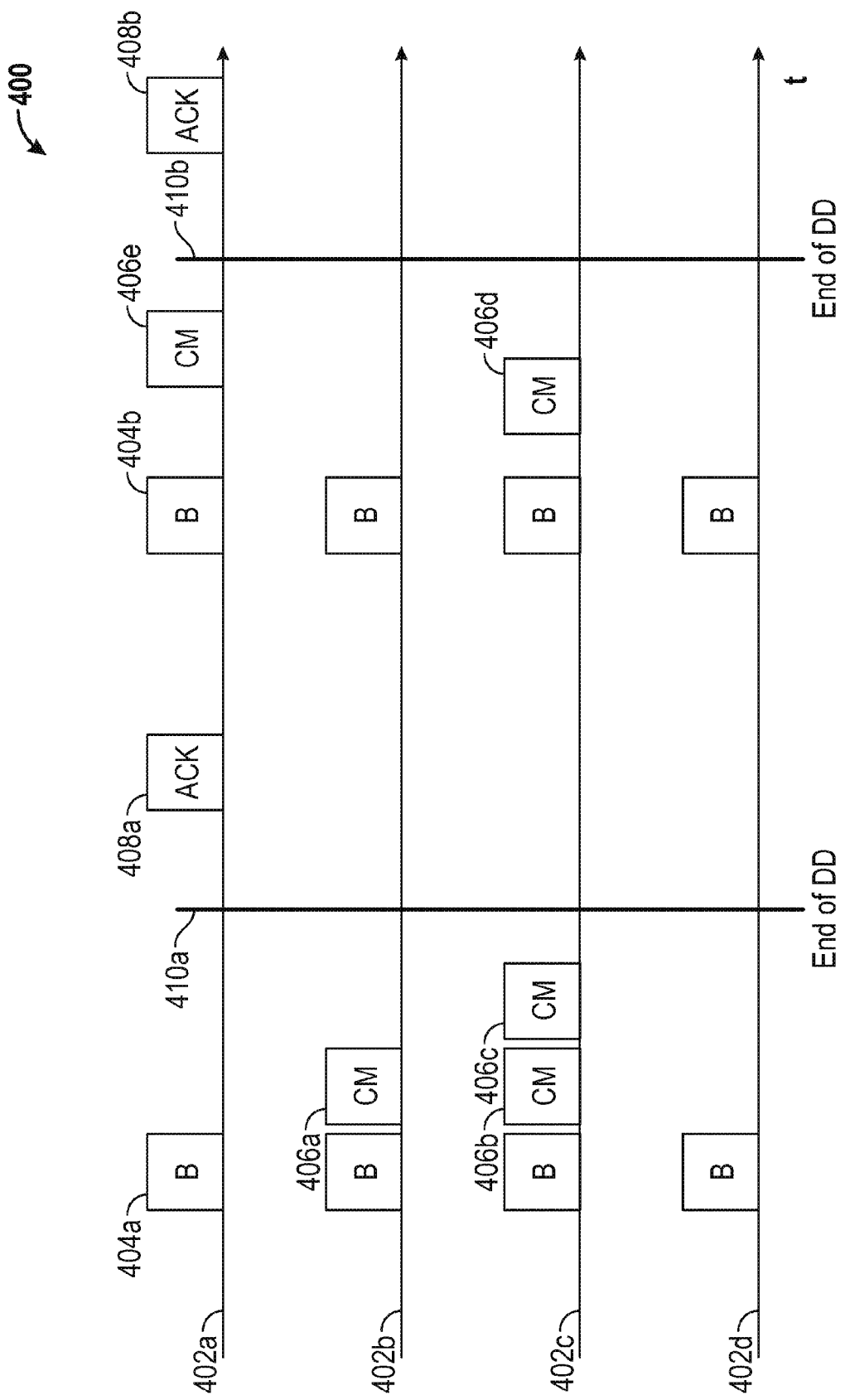
FIG. 4 illustrates an example wireless communication timeline.

FIG. 4 illustrates an example communication timeline 400 in a wireless communication system. The communication timeline 400 shows wireless communication on four channels for narrowband communication. Time increases horizontally across the page over the time axis. Line 402a may illustrate communication on a first 2 MHz channel while lines 402b, 402c, 402d may each illustrate communication on other, different 2 MHz channels. The beacons (B) 404a, 404b may be a beacon signal or message as discussed in this disclosure, for instance. The configuration messages (CM) 406a, 406b, 406c, 406d, 406e may be configuration messages as discussed in this disclosure, for instance.

The AP 304 may transmit beacon messages such as beacons 404a, 404b. The beacon messages may indicate the start of a dedicated duration (DD) for the STAs to transmit messages (e.g., configuration messages) to the AP 304. During the dedicated duration, the AP 304 may stay in a receive mode to receive messages on one or more channels. As illustrated in FIG. 4, the beacon message may be transmitted on multiple channels. However, the beacon may be transmitted on one or more channels additionally or alternatively in other aspects. In some aspects the beacon is sent at least on the current primary channel. In some aspects, the beacon messages may indicate the duration or end of the dedicated duration, such as the end of dedicated durations 410a, 410b. In particular aspects, the beacon messages may not indicate the duration or end of the dedication duration, but rather the STAs may be aware of the duration or end because of, for example, a standard dedicated duration time or programmed dedicated duration at manufacture.

STAs may receive beacon messages, such as beacons 404a, 404b, from the AP 304. In some aspects, the STAs may be configured to defer transmission of configuration messages on one or more channels until after receipt of a beacon message. Further, the STAs may be configured to enable transmission of configuration messages by the STA only during a dedicated duration immediately following a received beacon message. Before a STA, such as the first STA 306a, transmits a configuration message during the dedicated duration, the STA may check one or more channels for communication and, if communication is detected or determined, defer as discussed in this disclosure.

The AP 304 may transmit an acknowledgment message in response to one or more configuration messages transmitted by STAs. The acknowledgement message may be a unicast or multicast message transmitted after the dedicated duration to acknowledge all STAs for which the AP 304 successfully received a configuration message. In some aspects, the acknowledgment message may be transmitted during the dedicated duration.

A STA, such as the first STA 306a, may receive acknowledgment messages from the AP 304 and determine whether the acknowledgement messages are intended to acknowledge receipt of a configuration message transmitted by the STA. If a received acknowledgement message is so intended, the STA may prepare for communication with the AP 304 on the channel selected by the STA. On the other hand, if the received acknowledgement messages are not intended to acknowledge receipt of the configuration message transmitted by the STA, the STA may wait for another dedicated duration to again transmit the configuration message to the AP 304.

As a more exhaustive example, as illustrated in FIG. 4, the AP 304 may transmit beacons 404a on a first 2 MHz channel, a second 2 MHz channel, a third 2 MHz channel, and a fourth 2 MHz channel corresponding to lines 402a, 402b, 402c, 402d, respectively. Each of the channels covers a different 2 MHz channel or frequency band. A plurality of STAs may receive the beacons 404a. Based on received beacons 404a, the plurality of STAs may estimate the quality of each of the four channels. Each STA may select a channel with a highest quality based at least in part on the estimated quality of each channel. Further, the STAs may receive information about a dedication following the beacons 404a, such as an end time of the dedicated duration 410a.

Continuing the more exhaustive example, the first STA 306a transmits a configuration message using on contention on the second 2 MHz channel. The first STA 306a transmitted on the second 2 MHz channel because the second 2 MHz channel is the channel with the highest quality as determined by the first STA 306a. Additionally the second STA 306b and the third STA 306c transmit a configuration message 406b and 406c, respectively, on the third 2 MHz channel, which was determined by the second STA 306b and the third STA 306c to be the channel with the highest quality.

Further continuing the more exhaustive example, after the end of the dedicated duration 410a, the AP 304 transmits a multicast acknowledgement message 408a on the first 2 MHz channel. The first STA 306a and the second STA 306b determine based on the acknowledgment message 408a that the STAs may proceed to communicate on the selected channels. The third STA 306c, however, does not receive an acknowledgment directed to the third STA 306c in the acknowledgment message and determines to again send the configuration message during a next dedicated duration.

Continuing the more exhaustive example, the AP 304 may transmit beacons 404b on the four channels. The fourth STA 603d, which may have been powered off during the previous dedicated duration, now estimates the channels based on the beacons 404b and selects first 2 MHz channel for communication. The third STA 306c and the fourth STA 306d transmit configuration messages 406d, 406e, respectively, based on contention. After the end of the dedicated duration 410b, the third STA 306c and the fourth STA 306d determine based on the multicast acknowledgment message 408b that the third STA 306c and the fourth STA 306d may proceed to communicate on the selected channels.

FIG. 5A illustrates an example communication timeline 500 in a wireless communication system. The communication timeline 500 shows wireless communication on four channels for narrowband communication. Time increases horizontally across the page over the time axis. Line 502a may, for example, illustrate communication on a first 2 MHz channel while lines 502b, 502c, 502d may each illustrate communication on other, different 2 MHz channels. The configuration messages 506a, 506b, 506c, 506d may be configuration messages as discussed in this disclosure, for instance.

The AP 304 may be configured to transmit channel indication (CI) messages 504a, 504b. In some aspects, the channel indication messages 504a, 504b may be included in a beacon message (e.g., as an information element) or a TIM message. The channel indication messages 504a, 504b may notify devices of available channels for wireless communication with the AP 304 and when the available channels are available. For example, the AP 304 may only receive communications on one or more particular channels for a certain duration of time, and then the AP 304 may channel hop to a next one or more channels and receive communications only on those channels for a duration of time. In some aspects, the channel indication messages may not notify STAs of available channels or when the available channels are available, but rather the STAs may already be aware of such information because of, for example, a standard set of available channels or programmed hopping sequences at manufacture. Further, in some aspects, the channel indication messages may indicate the AP 304 channel timing schedule only for a period of time until a next channel indication message. In other aspects, the channel indication messages may indicate the channel timing schedule for a period of time longer than a next channel indication message or may re-notify of a repeated channel hopping pattern by the AP 304.

In some aspects, the AP 304 transmits channel indication messages periodically. Such an approach may be advantageous because it may permit easy management of transmitting and receiving channel indication messages, as well as because STAs may not need to wait long to receive channel timing schedule information or may know in advance when channel indication messages may be transmitted. In other aspects, the AP 304 transmits channel indication messages non-periodically. Such an approach may result in reduced waste in a system with a significant number of narrowband STAs, as well as may permit the AP 304 to receive messages on one or more channels only as long as needed. In some aspects, the AP 304 may coordinate the transmission of channel indication messages and the selection of the channel timing schedule based on communications with other devices, such as STAs in communication with the AP 304.

STAs may receive channel indication messages 504a, 504b from the AP 304. In some aspects, the STAs may defer transmission of configuration messages on one or more channels until the STAs determine that the AP 304 is receiving on a preferred channel, such as a channel determined to have a highest quality. Before a STA such as the first STA 306a transmits a configuration message, the STA may sense and select one or more channels, such as the channel with the highest quality, for communication and, if communication is detected or determined, defer as discussed in this disclosure. Additionally, the STAs may enter a doze state or power save mode when the AP 304 may not be communicating on a preferred channel or with the STAs.

Figure 5B:
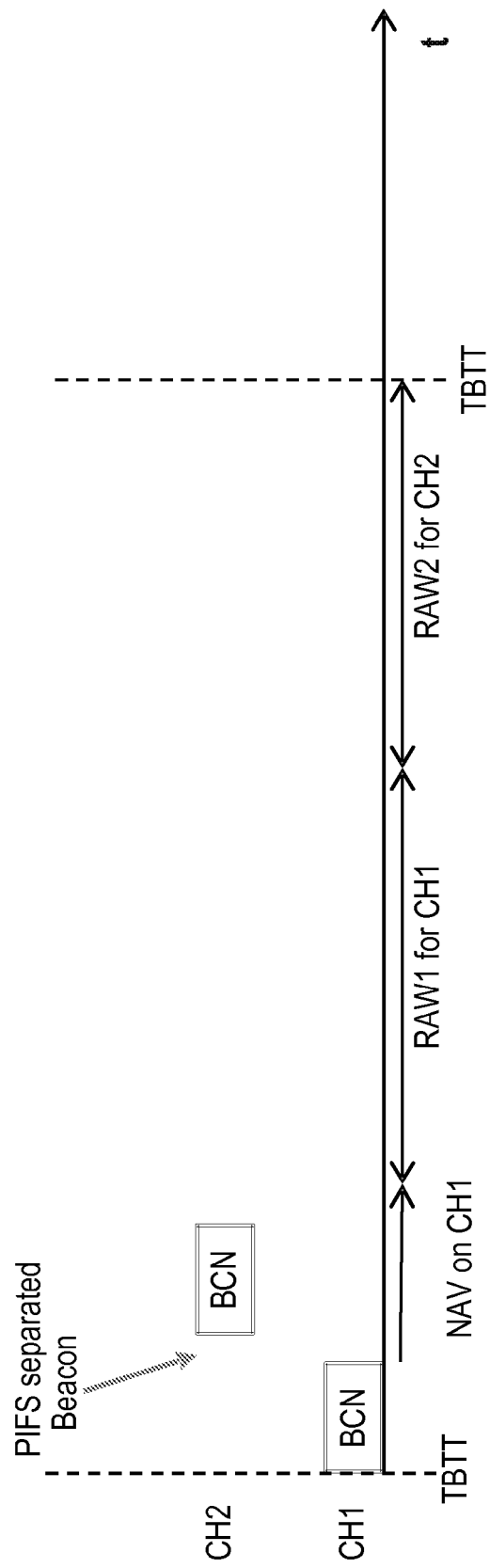
FIG. 5B illustrates an example of a first restricted access window for a first channel and a second restricted access window for a second channel.

Some implementations enable an operational mode where contention is allowed on a single channel at a given time. Such implementations may avoid multichannel hidden nodes, may be compatible with a single-correlator AP, and/or may enable channel hopping for APs with narrowband (for example, 2 MHz BSS). In some implementations, a restricted access window (RAW) for a given channel may be used to restrict access to a group of STAs in a given interval. As STAs are free to choose the preferred channel, a RAW may not enforce contention on a specific channel. If multiple STAs are assigned the same restricted access window, multi-channel collision may occur. In some implementations, a restricted access window (RAW) includes a channel indication. For such a RAW, contention may be allowed only in the indicated channel. As multiple restricted access windows can be defined in a beacon interval (BCN), including a channel indication allows indication of a channel hopping pattern within a beacon interval. Such implementations may be more flexible than just having a channel bitmap in a beacon (BCN) (that is, having a beacon including just a channel bitmap). To minimize overhead and simplify operation, a persistent definition of a restricted access window may be used. FIG. 5B illustrates an example of a first restricted access window for a first channel and a second restricted access window for a second channel, each indicated in a beacon (BCN) message. Including in a restricted access window an indication of the channel to be used for contention may enable operational modes by, for example, avoiding multichannel hidden nodes, it may be compatible with a single-correlator AP, it may be similar to frequency hopping solution from other standards, and/or it may enable the use of channel hopping for APs with narrowband (for example, 2 MHz BSS).

In some implementations, the channel indication message may be an information element with the following format:

Alternatively or additionally, in some implementations, the channel indication message may be an information element that has a compact signaling and includes one or more of the following triplets of fields (from above table): RAW start time, RAW duration, and Channel(s). The number of triplets may be inferred by the Length field of the information element. In this case, the channel access may be exclusive to an indicted channel, and the allowed transmission bandwidth may be the one spanning the allowed channels. One advantage of this compact signaling may be that, with a single information element, a hopping pattern can be defined with a relatively minimal length.

As illustrated in FIG. 5A, the AP 304 may periodically transmit channel indication messages 504a, 504b on a first 2 MHz channel corresponding to line 502a. The STAs near the AP 304 may have previously received one or more messages from the AP 304 on the first 2 MHz channel, a second 2 MHz channel, a third 2 MHz channel, and a fourth 2 MHz channel, corresponding to lines 502a, 502b, 502c, 502d, respectively. Based on the received messages, the STAs may have estimated the quality of the four different 2 MHz channels and selected the channel with the highest quality for communication based on the estimated quality of each channel. At the beginning time of the lines 502a, 502b, 502c, 502d, the STAs may await a channel indication message from the AP 304 to determine available channels for wireless communication and when the available channels are available.

Continuing the example, the AP 304 may then transmit the channel indication message 504a on the primary channel. The first STA 306a, the second STA 306b, the third STA 306c, and

| Feature | Value | Interpretation |
|---|---|---|
| Page ID | TBD bits | Indicates the page index for hierarchical AID (based on hierarchical AID) of the allocated group |
| Block Offset | TBD bits | Assuming 32 blocks per page, these bits indicate the starting block index of the allocated group |
| Block Range | TBD bits | Indicates the number of blocks (starting from the block offset) for the allocated group |
| RAW Start Time | 8 bits | Duration in TU from end of beacon transmission to restricted access window (RAW) Start time<br>An issue with above definition: Beacon may be delayed and may be of variable length so the RAW will depend on each beacon end time.<br>Alternative implementation 1: RAW start time is expressed in TU from the TBTT [this is more deterministic, as TBTT (target beacon transmit time) may be a fixed well known time by all STAs; TU = Time Unit = 1024 us]<br>Alternative implementation 2: (Partial) TSF (TSF is the clock of the network, which all the STAs may know) indicating the absolute start time for the RAW |
| RAW Duration | TBD bits | Duration of restricted access window (RAW) in TU |
| Channel(s) | TBD bits | Indicates that contention is allowed only in the indicated channel(s) for the time of this RAW; Channels may be indicated by listing the Channel ID number as defined by the regulatory domain or may be indicated by a relative index identifying the channel position within the BSS operating bandwidth. |
| BW(s) of allowed transmissions | TBD bits | Indicates that transmissions in the RAW are allowed only with a given bandwidth(s) |
| Exclusive access | TBD bits | Indicates that outside of this RAW, no transmission is allowed, unless another RAW is defined covering the time not covered by this RAW and allowing access. |
| Direction | TBD bits | Indicates if transmissions on this RAW are allowed in UL (from STA to AP) or downlink (from AP to STA) or both |
| Access restricted to paged STA only | 2 bits | Bit 1: Set to 1 if only STA with their TIM bit set to 1 are allowed to perform UL transmissions<br>Bit 2: Set to 1 if RAW is reserved for frames with duration smaller than slot duration, such as PS-Polls/trigger frames (ignored if Bit 1 is not set) |
| Group/Resource allocation frame indication | 1 bit | Set to 1 to indicate if STAs need to wake up at the beginning of the RAW to receive group addressed frames such as resource allocation |
| Slot definition | TBD bits | Include<br>Slot duration signaling<br>Slot assignment to STA<br>Cross boundary transmissions allowed/not allowed | the fourth STA 306*d* may receive the first channel indication message 504*a* and prepare to communicate a configuration message on the selected channels based on a channel timing schedule contained in the channel indication message. The channel timing schedule may indicate that the AP 304 is first receiving communications on the second 2 MHz channel. The first STA 306*a*, desiring to communicate on the second 2 MHz channel, may contend for transmission on the channel and transmit the configuration message 506*a*. At a time later, the AP 304 may channel hop 508*a* and begin receiving communications on the fourth 2 MHz channel.

Further continuing the example, the second STA 306*b* may now contend for transmission on the fourth 2 MHz channel and transmit the configuration message 506*b* based on the channel timing schedule, which may indicate that the AP 304 is receiving communications on the second 2 MHz channel. At a time later, the AP 304 may channel hop 508*b* and begin receiving communications on the third 2 MHz channel. The third STA 306*c* may now contend for transmission on the third 2 MHz channel and transmit the configuration message 506*c* based on the channel timing schedule, which may indicate that the AP 304 is receiving communications on the third 2 MHz channel.

Continuing the example, the AP 304 sometime later may transmit a second channel indication message 504*b*. The channel indication message 504*b* may update the channel timing schedule stored at the STAs to reflect future channel timings for the AP 304. At a time later, the AP 304 may channel hop 508*c* and begin receiving communications on the first 2 MHz channel (i.e., the primary channel in this example). The third STA 306*c* may now contend for transmission on the first 2 MHz channel and transmit the configuration message 506*d* based on the updated channel timing schedule, which may indicate that the AP 304 is currently receiving communications on the primary channel.

In some implementations, a STA may additionally or alternatively send to the AP a message indicating that the STA will be awake at a certain time, for at least a minimum duration of time, for receiving or transmitting packets from/to the AP. The AP may respond to the message, accepting the proposed schedule, denying it, or proposing a modified one. This mechanism may be known as Target Wake Time (TWT) in the 802.11ah standard. In the message exchange for the setup of a TWT, the AP may further indicate on which channel or channels the communication will be allowed at the scheduled time and the duration of time for which transmission on that channel is allowed; communication may not be allowed on other channels at that time. In the message exchange for the setup of a TWT, the STA may further indicate the preferred channel or channels for communication and the maximum duration of time for communication in that channel. The AP may consider this indication for its response, for example, by denying the request, proposing a different channel, or accepting the suggested channel and proposing a different time.

Figure 13:
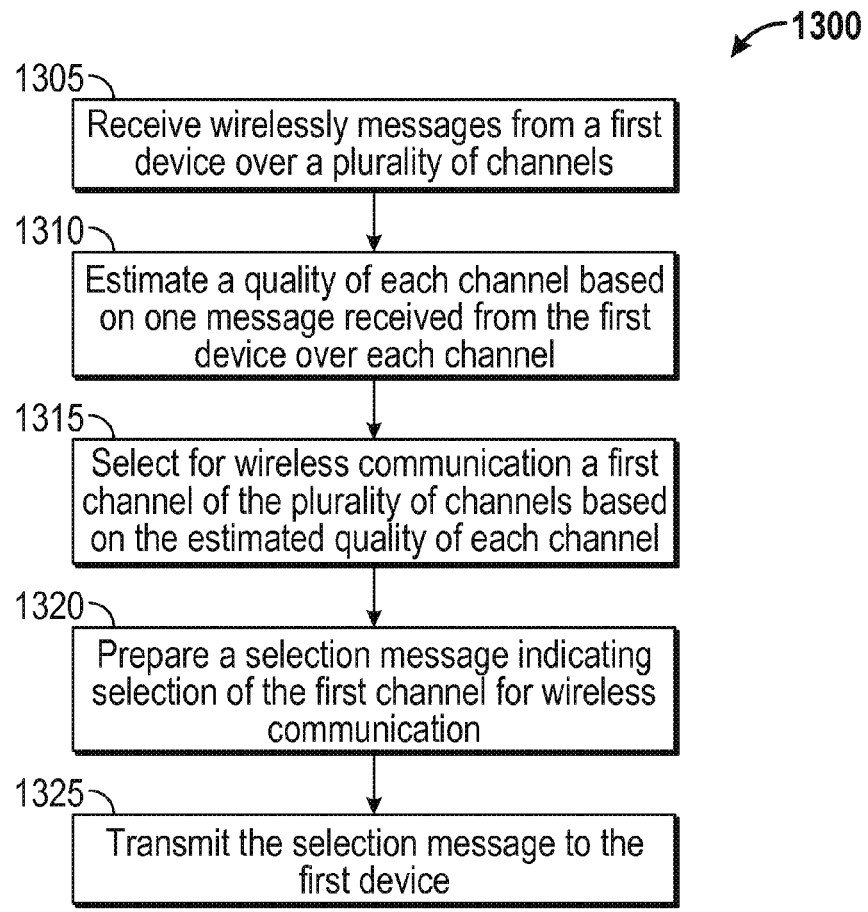
FIG. 13 is a flowchart of an example method for selection of a channel in a wireless communication system.

FIG. 13 is a flowchart of an example method 1300 for selection of a channel in a wireless communication system. The method 1300 may be performed using the wireless device 202 of FIG. 2, for example. Although the process 1300 is described below with respect to the elements of wireless device 202 of FIG. 2, other components may be used to implement one or more of the steps described herein.

At block 1305, messages may be wirelessly received from a first device over a plurality of channels. The receiving may be performed by the receiver 212, for example.

At block 1310, the quality of each channel of the plurality of channels may be estimated based at least in part on one message received from the first device over each channel. The quality estimation may be performed by the processor 204, for example.

At block 1315, a first channel of the plurality of channels may be selected for wireless communication based at least in part on the estimated quality of each channel. The channel having a highest quality (e.g., the channel having a greatest signal to noise ratio) may be selected as the first channel. The selection may be performed by the processor 204, for example.

At block 1320, a selection message may be prepared. The selection message may indicate selection of the first channel for wireless communication. The preparation may be performed by the processor 204, for example.

At block 1325, the selection message may be transmitted to the first device. The transmission may be performed by the transmitter 210, for example.

Figure 14:
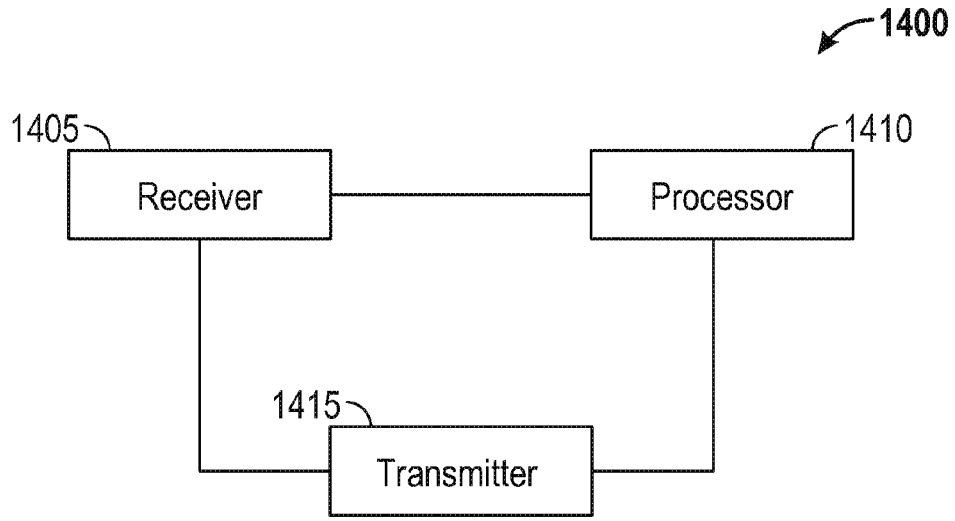
FIG. 14 is a functional block diagram of an example wireless communication device.

FIG. 14 is a functional block diagram of an example wireless communication device 1400. The wireless communication device 1400 may include a receiver 1405 configured to receive wirelessly messages from a first device over a plurality of channels. The receiver 1405 may be configured to perform one or more functions discussed above with respect to block 1305 of FIG. 13. The receiver 1405 may correspond to the receiver 212. The wireless communication device 1400 may further include a processor 1410 configured to estimate the quality of each channel of the plurality of channels, select for wireless communication a first channel of the plurality of channels based on the estimated quality of each channel, and prepare a selection message. The processor 1410 may be configured to perform one or more functions discussed above with respect to blocks 1310, 1315, and 1320 of FIG. 13. The processor 1410 may correspond to the processor 204. The wireless communication device 1400 may further include a transmitter 1415 configured to transmit the selection message to the first device. The transmitter 1415 may be configured to perform one or more functions discussed above with respect to block 1325 of FIG. 13. The transmitter 1415 may correspond to the transmitter 210.

Moreover, in one aspect, means for wirelessly receiving messages from a first device may comprise the receiver 1405. In another aspect, means for estimating a quality of each channel, selecting for wireless communication a first channel, and preparing a selection message may comprise the processor 1410. In yet another aspect, means for transmitting the configuration message to the first device may comprise the transmitter 1415.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A first wireless device comprising:
   a receiver configured to wirelessly receive messages from a second wireless device over a plurality of channels;
   a processor configured to
      estimate a quality of each of the plurality of channels based on one or more messages received from the second wireless device over each of the plurality of channels respectively,
      select for wireless communication with the second wireless device, a first channel of the plurality of channels based on the estimated quality of each of the plurality of channels, and
      prepare a selection message indicating selection of the first channel for wireless communication; and
   a transmitter configured to transmit the selection message to the second wireless device.

2. The first wireless device of claim 1, wherein
the processor is configured to
determine a primary channel of the plurality of channels used by the second wireless device for wireless communication with the second wireless device, and
select as the first channel a channel having a highest estimated quality of the plurality of channels,
wherein when the transmitter transmits the selection message on the primary channel, data contents of the selection message indicate selection of the first channel, and when the transmitter transmits the selection message on the first channel, the data contents of the selection message do not indicate selection of the first channel,
wherein each channel of the plurality of channels comprises a frequency bandwidth.

3. The first wireless device of claim 1, wherein the processor is configured to defer transmission of the selection message on the first channel until the receiver detects no communication on the first channel or the processor determines that a first communication on the first channel is complete.

4. The first wireless device of claim 3, wherein
the receiver is configured to detect communication on the first channel using channel energy detection; or
the processor is configured to determine that the first communication is complete using preamble detection.

5. The first wireless device of claim 3, wherein
the receiver is configured to wirelessly receive a beacon message from the second wireless device, the beacon message indicating a start of a dedicated duration for transmission of selection messages; and
the processor is configured to
defer transmission of the selection message until after receipt of the beacon message, and
enable transmission of the selection message during the dedicated duration.

6. The first wireless device of claim 5, wherein
the receiver is configured to wirelessly receive acknowledgment messages from the second wireless device, the acknowledgement messages acknowledging receipt of selection messages; and
the processor is configured to
determine whether the acknowledgement messages acknowledge receipt of a first selection message transmitted by the transmitter, and
cause the transmitter to wirelessly transmit the selection message to the second wireless device in response to determining that at least one acknowledgement message does not acknowledge receipt of the first selection message.

7. The first wireless device of claim 1, wherein
the receiver is configured to wirelessly receive a channel indication message from the second wireless device, the channel indication message notifying devices of available channels for wireless communication with the second wireless device and when the available channels are available; and
the processor is configured to determine when to transmit the selection message based at least on the channel indication message.

8. The first wireless device of claim 7, wherein the receiver is configured to receive the channel indication message from the second wireless device on a primary channel.

9. The first wireless device of claim 7, wherein the receiver is configured to periodically receive the channel indication message.

10. The first wireless device of claim 7, wherein the processor is configured to enter a power save mode when the channel indication message indicates that the second wireless device is not communicating on the first channel.

11. The first wireless device of claim 1, wherein the processor is configured to defer transmission of the selection message on a primary channel until the receiver detects no communication on the primary channel or the processor determines that a first communication on the primary channel is complete.

12. The first wireless device of claim 1, wherein
the transmitter is configured to wirelessly transmit the selection message on a primary channel, the selection message comprising a request to send message;
the receiver is configured to wirelessly receive acknowledgment messages from the second wireless device on the primary channel, each acknowledgment message comprising a clear to send message; and
the processor is configured to
defer transmission of data on the first channel until after receipt of a first acknowledgment message acknowledging receipt by the second wireless device of a first selection message transmitted by the transmitter, and
determine whether a communication is complete on the primary channel based at least on a time indicated in the clear to send message of a second acknowledgement message.

13. The first wireless device of claim 1, wherein
the processor is configured to prepare a null data packet comprising a physical layer preamble, the null data packet indicating to devices to defer communication on a primary channel or a second channel; and
the transmitter is configured to wirelessly transmit the null data packet on the primary channel.

14. The first wireless device of claim 1, wherein
the receiver is configured to wirelessly receive on a primary channel from a second device a null data packet comprising a physical layer preamble; and
the processor is configured to defer communication on the primary channel or a second channel based on the null data packet.

15. The first wireless device of claim 1, wherein
the receiver is configured to periodically wirelessly receive a traffic indication map (TIM) message from the second wireless device on a primary channel, the TIM message indicating whether devices have data buffered at the second wireless device;
the processor is configured to select either the primary channel or the first channel as a transmission channel; and
the transmitter is configured to wirelessly transmit the selection message to the second wireless device on the transmission channel, the selection message comprising a polling message indicating selection of the first channel for receipt of data buffered at the second wireless device.

16. The first wireless device of claim 15, wherein
the processor is configured to prepare an acknowledgment message indicating that data received from the second wireless device was correctly received; and
the transmitter is configured to wirelessly transmit the acknowledgement message on the first channel.

17. The first wireless device of claim 1, wherein the processor is configured to estimate the quality of each channel using a first process when the second wireless device operates in a first mode and using a second process when the second wireless device operates in a second mode, the first process being different from the second process.

18. A method of wireless communication comprising:
wirelessly receiving, by a first wireless device, messages from a second wireless device over a plurality of channels;
estimating, by the first wireless device, a quality of each of the plurality of channels based on one or more messages received from the second wireless device over each of the plurality of channels respectively;
selecting, by the first wireless device, for wireless communication with the second wireless device, a first channel of the plurality of channels based on the estimated quality of each of the plurality of channels;
preparing, by the first wireless device, a selection message indicating selection of the first channel for wireless communication; and
transmitting, by the first wireless device, the selection message to the second wireless device.

19. The method of claim 18, further comprising
determining a primary channel for wireless communication with the second wireless device,
selecting as the first channel a channel having a highest estimated quality of the plurality of channels,
when transmitting the selection message on the primary channel, data contents of the selection message indicate selection of the first channel, and
when transmitting the selection message on the first channel, the data contents of the selection message do not indicate selection of the first channel.

20. The method of claim 18, further comprising deferring transmission of the selection message on the first channel until detecting no communication on the first channel or determining that a first communication on the first channel is complete.

21. The method of claim 20, further comprising detecting communication on the first channel using channel energy detection; or determining that the first communication is complete using preamble detection.

22. The method of claim 18, further comprising
wirelessly receiving a beacon message from the second wireless device, the beacon message indicating a start of a dedicated duration for transmission of selection messages;
deferring transmission of the selection message until after receiving the beacon message; and
enabling transmission of the selection message during the dedicated duration.

23. The method of claim 22, further comprising
wirelessly receiving acknowledgment messages from the second wireless device, the acknowledgement messages acknowledging receipt of selection messages;
determining whether the acknowledgement messages acknowledge receipt of a first selection message; and
wirelessly transmitting the selection message to the second wireless device in response to determining that at least one acknowledgement message does not acknowledge receipt of the first selection message.

24. The method of claim 18, further comprising
wirelessly receiving a channel indication message from the second wireless device, the channel indication message notifying devices of available channels for wireless communication with the second wireless device and when the available channels are available; and
determining when to transmit the selection message based at least on the channel indication message.

25. The method of claim 24, further comprising receiving the channel indication message from the second wireless device on a primary channel.

26. The method of claim 24, further comprising periodically receiving the channel indication message.

27. The method of claim 24, entering a power save mode when the channel indication message indicates that the second wireless device is not presently communicating on the first channel.

28. The method of claim 18, further comprising deferring transmission of the selection message on a primary channel until detecting no communication on the primary channel or determining that a first communication on the primary channel is complete.

29. The method of claim 18, further comprising
wirelessly transmitting the selection message on a primary channel, the selection message comprising a request to send message;
wirelessly receiving acknowledgment messages from the second wireless device on the primary channel, each acknowledgment message comprising a clear to send message;
deferring transmission of data on the first channel until receiving a first acknowledgment message acknowledging receipt by the second wireless device of a first selection message; and
determining whether a communication is complete on the primary channel based at least on a time indicated in the clear to send message of a second acknowledgement message.

30. The method of claim 18, further comprising
preparing a null data packet comprising a physical layer preamble, the null data packet indicating to devices to defer communication on a primary channel or a second channel; and
wirelessly transmitting the null data packet on the primary channel.

31. The method of claim 18, further comprising
wirelessly receiving on a primary channel from a second device a null data packet comprising a physical layer preamble; and
deferring communication on the primary channel or a second channel based on the null data packet.

32. The method of claim 18, further comprising
periodically wirelesssly receiving a traffic indication map (TIM) message from the second wireless device on a primary channel, the TIM message indicating whether devices have data buffered at the second wireless device;
selecting either the primary channel or the first channel as a transmission channel; and
wirelessly transmitting the selection message to the second wireless device on the transmission channel, the selection message comprising a polling message indicating selection of the first channel for receipt of data buffered at the second wireless device.

33. The method of claim 32, further comprising
preparing an acknowledgment message indicating that data received from the second wireless device was correctly received; and
wirelessly transmitting the acknowledgement message on the first channel.

34. The method of claim 18, further comprising estimating the quality of each channel using a first process when the second wireless device operates in a first mode and using a second process when the second wireless device operates in a second mode, the first process being different from the second process.

35. A first wireless device comprising:
means for wirelessly receiving messages from a second wireless device over a plurality of channels;

means for estimating a quality of each of the plurality of channels based on one or more messages received from the second wireless device over each of the plurality of channels respectively;
means for selecting for wireless communication with the second wireless device, a first channel of the plurality of channels based on the estimated quality of each of the plurality of channels;
means for preparing a selection message indicating selection of the first channel for wireless communication; and
means for transmitting the selection message to the second wireless device.

36. The first wireless device of claim 35, further comprising
means for determining a primary channel for wireless communication with the second wireless device, and
means for selecting as the first channel a channel having a highest estimated quality of the plurality of channels,
when transmitting the selection message on the primary channel, data contents of the selection message indicate selection of the first channel,
when transmitting the selection message on the first channel, the data contents of the selection message do not indicate selection of the first channel.

37. The first wireless device of claim 35, further comprising means for deferring transmission of the selection message on the first channel until detecting no communication on the first channel or determining that a first communication on the first channel is complete.

38. The first wireless device of claim 35, further comprising
means for wirelessly receiving a beacon message from the second wireless device, the beacon message indicating a start of a dedicated duration for transmission of selection messages;
means for deferring transmission of the selection message until after receiving the beacon message; and
means for enabling transmission of the selection message during the dedicated duration.

39. The first wireless device of claim 38, further comprising
means for wirelessly receiving acknowledgment messages from the second wireless device, the acknowledgement messages acknowledging receipt of selection messages;
means for determining whether the acknowledgement messages acknowledge receipt of a first selection message; and
means for wirelessly transmitting the selection message to the second wireless device in response to determining that at least one acknowledgement message does not acknowledge receipt of the first selection message.

40. The first wireless device of claim 35, further comprising
means for wirelessly receiving a channel indication message from the second wireless device, the channel indication message notifying devices of available channels for wireless communication with the second wireless device and when the available channels are available; and
means for determining when to transmit the selection message based at least on the channel indication message.

41. The first wireless device of claim 35, further comprising means for deferring transmission of the selection message on a primary channel until detecting no communication on the primary channel or determining that a first communication on the primary channel is complete.

42. The first wireless device of claim 35, further comprising
means for wirelessly transmitting the selection message on a primary channel, the selection message comprising a request to send message;
means for wirelessly receiving acknowledgment messages from the second wireless device on the primary channel, each acknowledgment message comprising a clear to send message;
means for deferring transmission of data on the first channel until receiving a first acknowledgment message acknowledging receipt by the second wireless device of a first selection message; and
means for determining whether a communication is complete on the primary channel based at least on a time indicated in the clear to send message of a second acknowledgement message.

43. The first wireless device of claim 35, further comprising
means for periodically wirelessly receiving a traffic indication map (TIM) message from the second wireless device on a primary channel, the TIM message indicating whether devices have data buffered at the second wireless device;
means for selecting either the primary channel or the first channel as a transmission channel; and
means for wirelessly transmitting the selection message to the second wireless device on the transmission channel, the selection message comprising a polling message indicating selection of the first channel for receipt of data buffered at the second wireless device.

44. The first wireless device of claim 35, further comprising means for estimating the quality of each channel using a first process when the second wireless device operates in a first mode and using a second process when the second wireless device operates in a second mode, the first process being different from the second process.

45. A non-transitory computer storage that stores executable program instructions that direct an apparatus to perform a method of wireless communication, the method comprising:
wirelessly receiving, by a first wireless device, messages from a second wireless device over a plurality of channels;
estimating, by the first wireless device, a quality of each of the plurality of channels based on one or more messages received from the second wireless device over each of the plurality of channels respectively;
selecting, by the first wireless device, for wireless communication a first channel of the plurality of channels based on the estimated quality of each of the plurality of channels;
preparing, by the first wireless device, a selection message indicating selection of the first channel for wireless communication; and
transmitting, by the first wireless device, the selection message to the second wireless device.

46. The non-transitory computer storage of claim 45, wherein the process further comprises
determining a primary channel for wireless communication with the second wireless device, and
selecting as the first channel a channel having a highest estimated quality of the plurality of channels,
when transmitting the selection message on the primary channel, data contents of the selection message indicate selection of the first channel, when transmitting the selection message on the first channel, the data contents of the selection message do not indicate selection of the first channel.

47. The non-transitory computer storage of claim 45, wherein the process further comprises deferring transmission of the selection message on the first channel until detecting no communication on the first channel or determining that a first communication on the first channel is complete.

48. The non-transitory computer storage of claim 45, wherein the process further comprises
wirelessly receiving a beacon message from the second wireless device, the beacon message indicating a start of a dedicated duration for transmission of selection messages;
deferring transmission of the selection message until after receiving the beacon message; and
enabling transmission of the selection message during the dedicated duration.

49. The non-transitory computer storage of claim 48, wherein the process further comprises
wirelessly receiving acknowledgment messages from the second wireless device, the acknowledgement messages acknowledging receipt of selection messages;
determining whether the acknowledgement messages acknowledge receipt of a first selection message; and
wirelessly transmitting the selection message to the second wireless device in response to determining that at least one acknowledgement message does not acknowledge receipt of the first selection message.

50. The non-transitory computer storage of claim 45, wherein the process further comprises
wirelessly receiving a channel indication message from the second wireless device, the channel indication message notifying devices of available channels for wireless communication with the second wireless device and when the available channels are available; and
determining when to transmit the selection message based at least on the channel indication message.

51. The non-transitory computer storage of claim 45, wherein the process further comprises deferring transmission of the selection message on a primary channel until detecting no communication on the primary channel or determining that a first communication on the primary channel is complete.

52. The non-transitory computer storage of claim 45, wherein the process further comprises
wirelessly transmitting the selection message on a primary channel, the selection message comprising a request to send message;
wirelessly receiving acknowledgment messages from the second wireless device on the primary channel, each acknowledgment message comprising a clear to send message;
deferring transmission of data on the first channel until receiving a first acknowledgment message acknowledging receipt by the second wireless device of a first selection message; and
determining whether a communication is complete on the primary channel based at least on a time indicated in the clear to send message of a second acknowledgement message.

53. The non-transitory computer storage of claim 45, wherein the process further comprises periodically wirelessly receiving a traffic indication map (TIM) message from the second wireless device on a primary channel, the TIM message indicating whether devices have data buffered at the second wireless device;
selecting either the primary channel or the first channel as a transmission channel; and
wirelessly transmitting the selection message to the second wireless device on the transmission channel, the selection message comprising a polling message indicating selection of the first channel for receipt of data buffered at the second wireless device.

54. The non-transitory computer storage of claim 45, wherein the process further comprises estimating the quality of each channel using a first process when the second wireless device operates in a first mode and using a second process when the second wireless device operates in a second mode, the first process being different from the second process.

* * * * *